(12) United States Patent
Rothschild

(10) Patent No.: US 6,657,858 B2
(45) Date of Patent: Dec. 2, 2003

(54) HOUSING FOR DATA STORAGE DEVICES OR FOR ACCOMMODATING SUCH DEVICES

(76) Inventor: Philon Rothschild, Gersprenzweg 14, Offenbach (DE), 63071

( * ) Notice: Subject to any disclaimer, the term of this patent is extended or adjusted under 35 U.S.C. 154(b) by 20 days.

(21) Appl. No.: 10/099,375

(22) Filed: Mar. 14, 2002

(65) Prior Publication Data

US 2002/0093788 A1 Jul. 18, 2002

Related U.S. Application Data

(63) Continuation-in-part of application No. 09/542,255, filed on Apr. 30, 2000, now abandoned, which is a continuation-in-part of application No. PCT/EP98/06669, filed on Oct. 21, 1998.

(30) Foreign Application Priority Data

| Oct. 25, 1997 | (DE) | ......................................... | 197 47 210 |
| Dec. 2, 1997 | (DE) | ......................................... | 197 53 342 |
| Mar. 21, 1998 | (DE) | ......................................... | 198 12 479 |

(51) Int. Cl.[7] .............................. G06F 1/16; H05K 7/14
(52) U.S. Cl. .................... 361/685; 360/97.01; 165/121; 403/24; 248/581
(58) Field of Search .............................. 361/683–687, 361/724–727; 360/97.01–97.02; 248/581; 165/121; 403/24

(56) References Cited

U.S. PATENT DOCUMENTS

| 4,713,714 A | | 12/1987 | Gatti et al. .................. 248/581 |
| 4,812,932 A | * | 3/1989 | Hishinuma et al. ...... 360/97.01 |
| 4,896,777 A | | 1/1990 | Lewis .......................... 361/688 |
| 5,192,143 A | | 3/1993 | Lajara .......................... 403/24 |
| 5,209,356 A | | 5/1993 | Chaffee ...................... 361/724 |
| 5,214,549 A | | 5/1993 | Baker et al. .............. 360/97.02 |
| 5,231,549 A | * | 7/1993 | Morehouse et al. .......... 360/75 |
| 5,235,482 A | * | 8/1993 | Schmitz .................... 360/97.02 |
| 5,287,244 A | | 2/1994 | Hilsan et al. ................ 361/687 |

(List continued on next page.)

FOREIGN PATENT DOCUMENTS

| DE | 3 823 656 | 1/1990 |
| DE | 4 314 199 | 11/1994 |
| DE | 29 902 346 | 5/1996 |
| DE | 29 704 870 | 7/1997 |

*Primary Examiner*—Darren Schuberg
*Assistant Examiner*—Hung Van Duong
(74) *Attorney, Agent, or Firm*—Anton J. Hopen; Smith & Hopen, P.A.

(57) ABSTRACT

The invention is related to the housing of motorized driven data storage device(s) 20 or accommodating such device(s), comprising one or more drive assembly(s) 103, comprising one or more data storage media(s) and one or more drive motor(s) Together with suited fastening means, a damper-carrier-surface 50, a damper-fastening-surface 55, at least one respective carrier-surface-oscillation-damper 51 and a fastening-surface-oscillation-damper 74, is provided in order to support a data storage device 20. The damper-carrier-surface 50 and the damper-fastening-surface 55 are allocated to one side of the drive assembly 103 and to two opposite facing sides of a suitable supporting-surface 3. A carrier-surface-oscillation-damper 51 is arranged between the damper-carrier-surface 50 and the supporting-surface 3 and is situated with at least one respective contact surface on the damper-carrier-surface 50 and the supporting-surface 3 in at least a partially two-dimensional manner. In addition a fastening-surface-oscillation-damper 74 is arranged between the damper-fastening-surface 55 and the supporting-surface 3 and is situated with at least one respective contact surface on the damper-fastening-surface 55 and the supporting-surface 3 in at least a partially two-dimensional manner.

72 Claims, 15 Drawing Sheets

U.S. PATENT DOCUMENTS

| | | | |
|---|---|---|---|
| 5,422,770 A | * 6/1995 | Alt | 360/105 |
| 5,469,311 A | 11/1995 | Nishida et al. | 360/97.02 |
| 5,510,954 A | 4/1996 | Wyler | 361/685 |
| 5,510,955 A | 4/1996 | Taesang | 361/685 |
| 5,596,483 A | 1/1997 | Wyler | 361/683 |
| 5,638,895 A | 6/1997 | Dodson | 165/121 |
| 5,654,875 A | 8/1997 | Lawson | 361/685 |
| 5,668,697 A | 9/1997 | Dowdy | 361/685 |
| 5,801,899 A | 9/1998 | Genheimer | 360/97.01 |

* cited by examiner

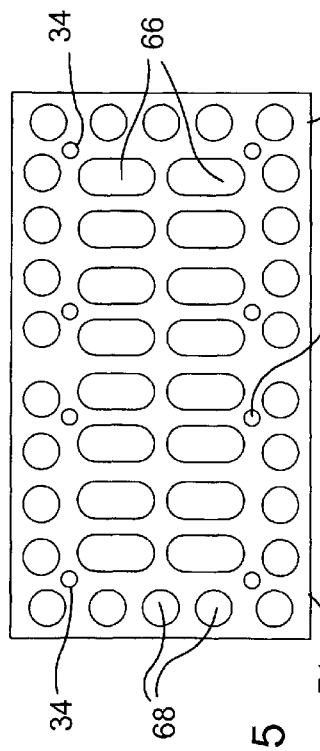
FIG. 25
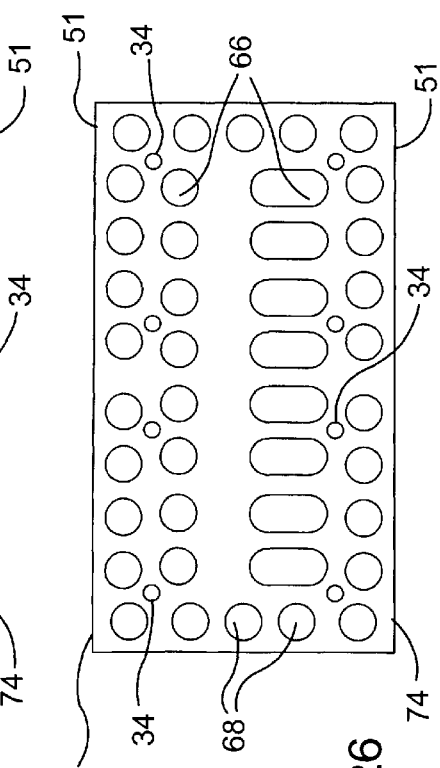
FIG. 26
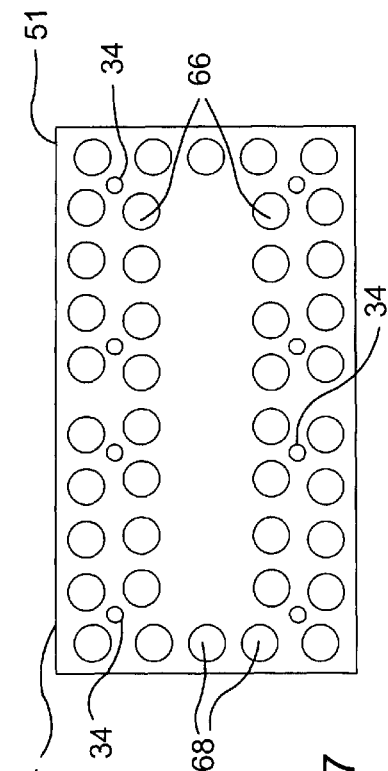
FIG. 27
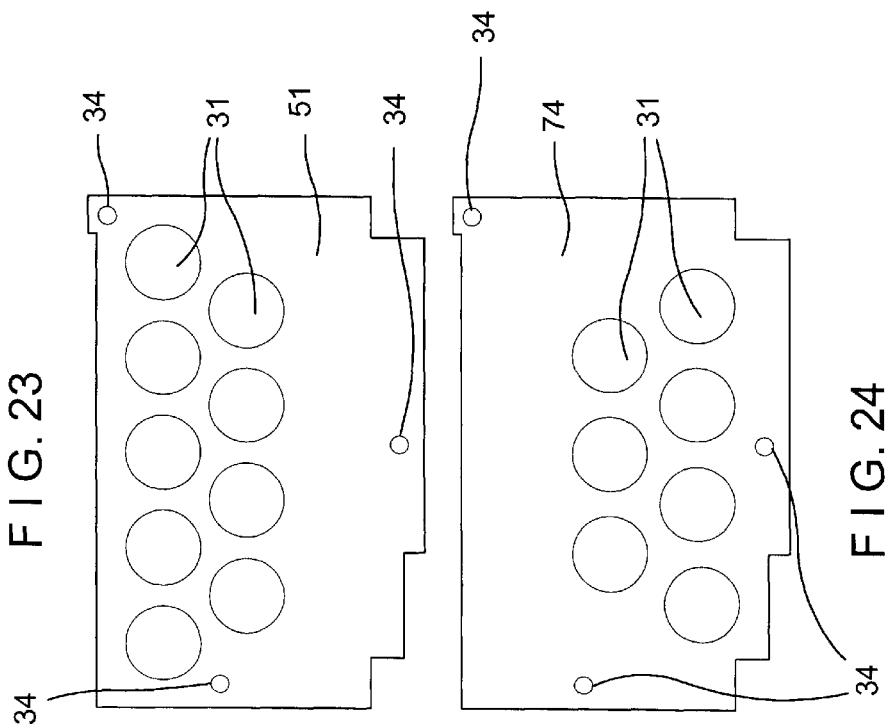
FIG. 23
FIG. 24

HOUSING FOR DATA STORAGE DEVICES OR FOR ACCOMMODATING SUCH DEVICES

This application is a continuation-in-part of U.S. patent application Ser. No. 09/542,255 filed Apr. 30, 2000 now abandoned, which is a continuation-in-part of PCT/EP98/06669, filed Oct. 21, 1998.

FIELD OF THE INVENTION

The invention is related to a housing for data storage devices or for accommodating such data storage devices.

BACKGROUND OF THE INVENTION

To operate for example a personal computer, usually a computer system is required comprising a disc drive, a central processing unit, a floppy disc drive as well as other devices which are assembled within a cuboid shaped housing. Fans are usually installed in such housings, maintaining an air-flow through the housing to facilitate the cooling of electronic and mechanic components while the computer is operating.

The acoustic noise emitted by such computers is often perceived as unpleasant by computer users. Regarding the acoustic noises solely generated by the fans, these are located in a middle-frequency range and therefore act subjectively less disturbing as the high-frequency acoustics, which are radiated by the computer and the alternating mix-mode noises generated by the mixture of noises. The high-frequency sound involving frequencies that may extend up to 9 kHz or more, are mainly generated by the drive motor of the data storage device. The disc media is driven at high velocity by the drive motor. Even if the high-frequency noise radiated by the housing and through the air vents only has a relative low amplitude, it annoys due to its permanent presence and particularly in a room (i.e. large area office) where a number of such computers are in use with the according noise emission. In such rooms a permanent whistle and warble is audible, which impairs the health and labor capacity of those who are working in such environment.

Due to severe competition, PC's and workstations have strongly diminished in price value and are meanwhile considered as mass products. A warranty period of 36 months, is meanwhile at least granted by all large vendors world wide and treated as a usual practice. Due to the fast technological progress the purchase value of a computer declines within shortest time, long before the warranty period expires. This leads to the circumstance that manufacturers and suppliers proceed to carry the risk of RMA handling, despite the fact that the commodity has lost its value to a great extent. RMA cases are mainly caused by those computer components which contain moving mechanical or force-driven parts. The failure of the mass-storage-device, the disc drive, usually causes the greatest single damage for the user as well as the manufacturer or supplier. Modem disc drives are sensitive against shock and in some instances, due to elevated power consumption, also against overheating. Already slight shocks may lead to a head crash. Such shock influence caused by the user, onto a commonly constructed computer, are not provable for the manufacturer or supplier. Therefore such defects automatically lead to a warranty obligation.

The state-of-the-art technology provides a variety of single or even combined solutions for the noise-reduction of computer housings, the cooling of oscillating devices and shock absorption for sensitive devices. The following publications on the state-of-the-art are considered as known.

DE-GM 297 04 870, DE-OS 38 23 656, DE-GM 296 02 346, DE-OS 43 14 199 U.S. Pat. No. 5,192,143, U.S. Pat. No. 5,510,954, U.S. Pat. No. 5,596,483, U.S. Pat. No. 5,287,244 U.S. Pat. No. 5,214,459, U.S. Pat. No. 5,668,697, U.S. Pat. No. 5,654,875, U.S. Pat. No. 4,812,932, U.S. Pat. No. 5,235,482, U.S. Pat. No. 5,469,311, U.S. Pat. No. 5,638,895, U.S. Pat. No. 5,801,899

In the DE-GM 297 04 870 an extensive de-coupling of body-oscillation is achieved by suspending the disc drive in o-rings made of rubber-elastic materials and lining the inner sides of the computer housing with rubber-cork mats. The disadvantage here is, that depending on the type of disc drive model, cumbersome adjustments of the suspensions are to be taken care of. In addition it is uncertain whether a slipping of the device during transport is prevented under all circumstances. This type of suspension contradicts the emphasized manufacturer specifications regarding the firm assembly of a disc drive. A disc drive suspended within a 5¼ inch slot-frame is positioned in the immediate rear of the computer front lid of standard computer housings. Thereupon one has to permanently shut a front lid to fully reduce the noise. A disc drive suspended within a 5¼ inch slot-frame can only be cooled exclusively by a fan from the bottom or with tiny fans from the side. An air stream only blowing at the bottom is often not sufficient. For the purpose of secure cooling, disc drive manufacturers usually prescribe that an air stream has to be maintained above the top side as well as the bottom side. As no further passive cooling is provided for the disc drive, a failure of the fan will lead to overheating in most instances. This is particularly fatal when a computer is operating unattended and no immediate response is given to a system warning indicating fan failure. Even if a fan failure recognition invokes an automatic system shut-down, this is equivalent to a system failure which has to be repaired prior further operation. Eventually the application of cork-rubber mats does not meet the UL regulations regarding fire hazards in electric devices.

The DE-OS 43 14 199 describes an artifice for conductive cooling of oscillation attenuated devices which are mounted within a closed housing. It is uncertain if the here described method of cooling is sufficient enough to cool, disc drives dissipating up to 20 W, exclusively by thermal conductive heat-relief, with an appropriate magnitude. Computers are specified with an ambient operating temperature of 35° C. for the medium latitudes and 40° C. for the warmer regions. However, disc drives available in the mass market are only offered with a maximum specified surface temperature of 55–60° C. The specified thresh hold temperature for maximum life time is most often located 10–15° C. below the maximum rated temperatures. This signifies that for a long life time a very effective cooling has to be implemented. For reasons of extensive assembly requirements the here described method is unusable for the mass market in any instance. Furthermore disc drives may not be mechanically altered due to warranty considerations. An effective heat-relief by means of copper braiding, is only achieved by soldering or welding onto the disc drive.

In the U.S. Pat. No. 5,192,143 shock absorbers for disc drives are described. It is not evident if these shock absorbers also enhance an effective noise reduction. Furthermore it is doubtful that these shock absorbers are sufficient to safe guard a disc drive against a shock of 30 g applied onto the housing during continuos operation. A shock of 30 g is already reached when a computer gets hit by a vacuum cleaner. Regular 3½ inch disc drives are specified with a maximum shock stress of 10 g during operation. No concerns about cooling the disc drive are to be extracted from this publication.

The so far as best known state-of-the-art is described in the U.S. Pat. Nos. 5,510,945 and 5,596,483. However, the disadvantage here is the hermetically encapsulated disc drive. Thereupon an active or passive direct air cooling is not possible. Here, the cooling of the disc drive is exclusively only achieved by thermal conductive heat-relief. The necessary air vents on the deck of the computer does not conform with any housing standards. The guided air stream depends too much on the implemented components and is already warmed up prior to reaching the location of the described heat-sink. No redundant cooling is existing. Two or even more only very slowly rotating fans and a convection air-stream guided through the power supply, are in total only sufficient for a computer equipped with low-power components. The encapsulation of the disc drive restricts the cooling to such an extent, that this method is not applicable in conjunction with powerful disc drives (refer to c't magazine edition 19/1998, start page 136 on page 142). The here described cooling pouch filled with liquid is pressed onto the bottom and top side of the disc drive with a broad two-dimensional shaped metal bracket in order to achieve a good thermal contact. The bottom side of a disc drive, regardless of what model type, is usually equipped with a printed circuit board on which sharp edged SMD components and connector pins are mounted. It can not be excluded that the efficiency of this cooling method may be endangered by the tearing of the cooling pouch during assembly, transport or while in operation. In addition the assembly and disassembly of the disc drive appears cumbersome here.

No concept is recognizable by the enlightenment extracted from the present state-of-the-art, that simultaneously contents the following criteria: 1) sufficient noise reduction in respect to subjective perception, 2) sufficient cooling for long life time even for powerful data storage devices within the narrow temperature range of data storage devices, 3) for the shock sensitivity of data storage devices a sufficient safe guard against shocks, which are possible in a typical working environment, 4) a solution for the previously described necessities with the least possible investment of material and assembly costs. Particularly no universal concept is recognizable within the present state-of-the-art that enables step wise modular extendable measures regarding noise reduction as well as cooling for the multitude of available data storage devices on the market, which individually develop different types of noise emission and heat dissipation.

The disc drive will be considered as the main cause of generating the subjectively unpleasant noise development. With the present state-of-the-art disc drive technology, this circumstance is well founded therein, that a disc drive contains at least four distinct noise sources. The bearings of the drive motor and the disc media are responsible for the high-frequencies on one hand and the alternating magnetic fields generated in the drive motor on the other hand. The low and also high energetic oscillations are caused by the unbalance, due to manufacturing tolerance, of the disc media on the one hand and by the acceleration and deceleration forces of the read/write heads on the other hand. Due to the world wide regulated limits of RF radiation by electric devices, the application of metal housings for computers remains indispensable for an effective EMI protection. The usual metal-to-metal-assembly of disc drives in housings, inevitably leads to an amplified radiation of sound noises by the metal surfaces. Moreover, depending on the type of housing construction, particularly the high-energetic low-frequency oscillations cause an uncontrolled stimulation of the sheet metal at different harmonics of the basic frequencies.

Therefore this invention is based upon the objective, to seize measures within the previously explained type of housing, which will suppress the subjectively unpleasant noise radiation as extensively as possible. Simultaneously the data storage device is to be safe guarded against typical shocks that may reach the housing. Further, noiseless and failsafe cooling measures are to prevent the thermal self destruction of the data storage device. Furthermore, the determined measures are to be organized within a unified concept, as to enable step wise modular extensions, so that only the necessary and sufficient measures are to be implemented for the different power classes. In addition the design of the housing should enable cost efficiency in mass production, regarding the assembly steps as well as the invested material. In conjunction with the mentioned modular concept, an optimized cost reduction is to be achieved by a production turn out with a variety of different computer models.

SUMMARY OF THE INVENTION

The solution of the assigned task as set forth below and the majority of the particular embodiments displayed here, were designed in their construction and therewith geometrically for the system integration of data storage devices into a computer/server or other housing. However, as the preferred embodiments eventually reveal, it becomes self evident that at least some portions of the invention may very well become integrated parts of the data storage device itself. To avoid any terminology confusion, per definition the term disc drive or data storage device is applied when referring to a typical data storage device as shipped by drive manufacturers. Per definition the term "drive assembly" as used here, is the part of a data storage device onto which a drive motor is assembled which drives the data storage media. A drive assembly may comprise further components such as read/write head actuators and other elements. A data storage device could per example also be a CD-ROM drive, a floppy drive, a magneto optical drive and so forth.

The basic principle which is applied in accordance to the invention, is based upon de-coupling and oscillation-attenuation of the body- and air-sound, of all motor driven data storage devices installed in the housing relevant for the development of noise, against the common chassis. A combined thermal conductive and active and/or passive air-cooling is applied to achieve noiseless cooling of the storage device. Passive cooling, which makes the forced-cooling of motor driven data storage devices by fans dispensable, will lead to a further reduction of noise emission. If a motor driven data storage device is arranged in an air-vented hollow shaft in such a manner, that the internal perpendicular dimension of the shaft is scaled in relation to the wavelength of the expected noise pressure, the noise pressure will already be attenuated while unfolding in the adjacent air media. This will lead to a further reduction of the noise emission.

In accordance to the invention, the assigned task is solved by any given single or suitable combination of the independent claims 1, 17, 33, 49, 64 and 70.

The drive assembly of a disc drive is for example arranged in an assembly unit, which has a stiff damper-carrier-surface facing to the front of the assembly unit. The assembly unit with rectangle edges facing to the front is for example attached to the damper-carrier-surface with rivets and forms a singular mechanical unit with the assembly unit. As will be described in the following embodiments, this unit is preferably mounted onto the front panel of the chassis. However, any other suitable supporting-surface within the housing is bearable in mind. The front panel is preferably constructed as stiff as possible or may be reinforced with stiff surface means within the mounting area. The fastening means such as screws or other, gripping into the damper-carrier-surface, are supported on a stiff damper-fastening-surface facing to the outside of the front panel. A carrier-surface-oscillation-damper consisting of semi-elastic material, is located between the damper-carrier-surface of the assembly unit and the inner side of the supporting-surface. A fastening-surface-oscillation-damper consisting per example of the same material, is located between the assembly-damper-surface and the outside of the front panel. This semi-elastic material is fabricated in such a manner, that it is by far more elastic than the front panel but at the same time indicating enough support-force for the assembly unit including the supported disc drive. Furthermore, the fastening edges of the assembly unit serve the purpose of an end position for the fastening means that grip into the damper-carrier-surface. Therewith, adjusting the fasting means is dispensable. Simultaneously the total layer structure, consisting of the damper-carrier-surface, reinforced front panel, damper-fastening-surface and the two oscillation-dampers is matched with the fastening means in such manner that the two oscillation-dampers sustain under slight pressure, when the fastening means gripping into the damper-carrier-surface have reached the end position. Due to the sustained pressure of the dampers, the fastening means are to be considered as conditionally firmly attached to the damper-fastening-surface. Within the limits of the here occurring oscillation forces the damper-fastening-surface and the damper-carrier-surface remain in a continuous, relative rigid connection. The stiff structure of the two as two-dimensional evolving constructions, causes the oscillations generated by the disc drive to mainly introduce perpendicular into the dampers. Furthermore, the fastening means are always isolated in particular against the carrier- or supporting-surface between the two dampers and kept movable perpendicular to the damper surface or held at distance.

The herein above described reinforcement of the front panel, with reinforcement panel located in the mounting area of the assembly unit, may alternatively be achieved particularly in mass-production, by embossing support beams into the sheet metal of the front panel, so as to obtain the necessary stiffness of the supporting-surface or any other suitable surface within the housing. The herein above described damper-carrier-and-fastening-surfaces may alternatively adapt any other geometric structure, which will indirectly fulfill the task of achieving a two-dimensional-like contact with the damper surfaces. The surface contact is not compulsory of plane-parallel structure. Also, the dampers are not obliged to indicate plane-parallel structures or regular surfaces.

If the previously described damper layers are embodied symmetrically, this is considered as a low-pass with frequency independent coupling at the front panel between the two dampers. Coupling is conditioned due to the fact that two 180° phase-shifted oscillations which are equal in amplitude and frequency, hit the front panel with anti-parallel vector-direction. Coupling plays a subordinate role with frequencies ranging in the middle or even upper range, because the damping factor of this low-pass system is high. Due to the large two-dimensional embodiment of the dampers, the application of a soft damper material with enough support-force is possible. The stiff embodiment of the damper- carrier- and fastening-surfaces enable a strong distribution of the vertical oscillation forces throughout the surface of the dampers. A damper system in this configuration has a sufficient damping factor in the low-frequency range even under the condition of coupling. The low and high-energetic unsteady oscillations of a disc drive are caused by the read/write heads. Each data storage device model has its own characteristic head-oscillation behavior. The low-frequency and high-energetic steady oscillations are caused by the unbalance of the rotating disc media. Every data storage model has a typical rotational frequency according to its rotating speed. As the rotational frequency inclines linear with the rotating speed, the oscillation energy inclines quadratic with inclining rotating speed. The herein above described damper system is capable of attenuating the steady oscillations very effectively, if the layer-width of the carrier-surface-oscillation-damper and the layer-width of the fastening-surface-oscillation-damper are matched in their relation in such manner, that the attenuated oscillations of both dampers, with the typical rotational oscillation-frequency of the rotating media, hit the supporting-surface in-phase with anti-parallel vector-direction. Under these conditions counter-coupling takes place at the supporting-surface of the damper system. In accordance to the invention this frequency-dependent counter-coupling condition, induces a nearly complete self-elimination (the necessary difference in damper width causes a difference in amplitude) of the oscillations in the area of the supporting-surface. This signifies that two oscillations equal in phase and hitting the supporting-surface in opposing directions, nearly totally avoid any movement of the supporting-surface. A further precondition for the counter-coupling condition is the choice of a damper material with a particularly low speed of propagation for oscillations (considerably lower than i.e. air), in order to take an influence on the phase within the range of a half-wave ($\lambda/2$) with the here possible dimensions of dampers. Due to the virtually rigid connection between damper-carrier-surface and damper-fastening-surface, it is secured that the necessary phase conditions are permanently maintained (phase-locked-loop). Thereby, the oscillation energy is effectively attenuated against the reinforced supporting-surface and in conclusion also against the chassis. Simultaneously the self-oscillation of the data storage device is reduced to a negligible minimum, despite the fact that the data storage device is mounted soft relative to the housing. In that case, assembly prescriptions for data storage devices are fulfilled. A data storage device is to be assembled in such a manner that self-oscillation is avoided in order to prevent position-corrections of the read/write heads, which would resemble a loss of performance.

In a further embodiment of the invention, the herein above described damper system is equipped with a gadget for fast and easy tuning of the counter-coupling, to meet the counter-coupling condition. A tuning-plate is inserted between the damper-fastening-surface and the fastening-surface-oscillation-damper. The tuning-plate is guided by the fastening means. A thread-extension with a screw-thread is for example located on the middle outside face of the damper-fastening-surface. It is now possible to regulate the distance between the tuning-plate and the damper-fastening-surface with an appropriate screw. Therewith, the tension pressure between the two dampers may be elevated and simultaneously the layer width may be varied in a limited scale. As long as the dampers have been roughly dimensioned with the right proportion, this gadget enables a fine tuning to optimize the phase conditions. It may be of advantage if the two dampers are configured with different types of materials in order to further fine-tune the damper characteristics or that the dampers are each configured in layers consisting of materials indicating different properties. In order to be frequency independent in the vertical direction of a push-pull attenuation, a further construction may be useful, which connects the damper-carrier-surface and the damper-fastening-surface in a cross-over manner or force diverting, so that both panels always conduct opposing movements in the first place. Under such circumstances counter-coupling would be given at all frequencies with a symmetric embodiment of the dampers. However, the here necessary construction will be comparably lavish in relation to the gain of performance.

Within the framework of this invention it has become evident that the previously described symmetric push-pull damper version is sufficient for the present state-of-the-art data storage devices and in addition also very cost efficient in production.

Within the framework of a further embodiment of this invention, the carrier-surface-oscillation-damper and the fastening-surface-oscillation-damper may be blank-spaced with holes or passages in accordance to the individual support-force distribution. This measure induces a differentiated mass-distribution of the damper mass in such manner that even without adjustable fastening means, the data storage device unit will maintain a rectangular position relative to the front panel after assembly. The elasticity of the dampers and therewith the support-force has to be chosen in accordance to the different possible loads of this invention in order to make different types of compensations dispensable. Therewith, only one type of damper shape is necessary for the different assembly variations in mass production.

Due to the described embodiments of the invention and by appropriate dimensioning of the damper layer-width, the data storage device is also effectively safe guarded against shocks applied to the housing. With the previously described type of suspension a crank-bearing or "pivot" for the assembly unit is formed at the front panel between the two push-pull dampers, in vertical as well as horizontal direction. Conditioned by the embodiment of the damper surfaces and the position of the suspension points of the fastening means gripping into the damper-carrier-surface, the shock absorbing effect is controlled in such manner, that in perpendicular direction to the disc media more freedom of movement is permitted as in horizontal direction. Therewith, a stronger shock absorption is enabled in perpendicular direction to the disc media, as in horizontal direction. The shock sensitivity is always greatest perpendicular to the media, because the read/write heads move extremely close above and along the media.

The cost efficient damper system, in accordance to the invention, simultaneously serves the purpose of reducing noise as well as particularly an effective shock absorption and as a safe guard for the data storage device against shocks.

The assembly unit allocated to the drive assembly, may indicate different properties depending on the requirements and may serve the purpose for the assembly of further components beside the disc drive, as set forth below. Depending on the type of data storage device and the type and extent of additional components assembled in or onto the assembly-unit and depending on the composition of the assembly-unit material, the high-frequent oscillations emitted by the data storage device may lead to an amplification of the high-frequent noises due to resonance with the assembly unit or other components or their combination. In such instances, by a further embodiment of the invention in accordance to the invention, an oscillation-attenuating-layer is aligned between the assembly unit and the drive assembly, which has a high attenuation for high-frequent oscillations. Thereby, the fastening means gripping into the drive assembly are supported by oscillation de-coupling mounts on the assembly unit allocated to the drive assembly. Thereupon, a high-frequent oscillation generated by the data storage device is attenuated against the assembly unit, with further attached components in such a manner, that during operation of the computer the usual high whistle tone is not or hardly no longer perceivable.

Also here it may be of advantage if the drive assembly, the oscillation-attenuating-layer and the assembly unit are attached with a sufficient two-dimensional contact-surface in order to distribute the oscillation energy well across the surfaces, so that a maximum exploitation of the attenuation effect is achieved. Particularly hard-rubber washers which are for example attached to metal washers, are to be considered as mounts. For a better distribution of the torque-force on the side-wall-surface-means of the assembly unit by the fastening means gripping into the drive assembly, it has revealed to be advantageous in the framework of this invention to unify the mounts into one two-dimensional shaped component. The singular hard-rubber washers now form a rectangular long rubber part for each side of the drive assembly with a plurality, in this special instance three through-hole openings and an appropriately equally shaped metal piece also with three through-hole openings. This construction will be referred to as a torque-momentum-distributor-bridge further on. The torque-momentum-distributor-bridge is constructed in such manner that the individual torque momentum of the fastening means are equally distributed across the assembly-unit-side-wall-surface-means by the hard-rubber-layer. In the framework of this invention a 4 mm thick sheet metal has proven to be useful. The same effect may be achieved in other embodiments with thinner sheet metal shaped as U-profiles. Thereupon, the device is nearly fully isolated against the assembly unit in respect to high-frequent body oscillations. As such, the remaining relevant effective radiation surface for high-frequent oscillations are limited to the surface of the disc drive on one hand and an additional oscillation attenuation is achieved on the other hand. The fact that the oscillating surfaces adjacent to the surrounding air media have been reduced to the minimum of the data storage device surfaces, is now of particular advantage.

With the measures described herein above and the arrangement of the structure apparent in the drawings, a hollow shaft is formed around the data storage device with the aid of the damper-carrier-surface, the assembly unit itself or by the assembly unit and the above located cage, so that the high-frequent sound radiated into the ambient air is reflected away from the front panel into the direction of the housing rear. The inner sides of the housing lid and the bottom surface of the chassis may at least be partially lined with a flame thwarting sandwich material facilitating a further reduction of noise development. However, the application of foam linings will be dispensable as the further course of this description will reveal.

If one or more data storage device(s) is/are assembled in a housing of the previously mentioned type by insertion of an oscillating-damping-layer, it is recommended that the oscillation-damping-layer additionally indicates good thermal conductive features, that the layer indicates sufficient surface contact respectively to the side-wall-surface-means of the assembly unit, and that the assembly unit(s) is/are fabricated with a good thermal conductive material.

The largest heat sources of the data storage device are represented by the drive motor for the disc media and the actuator of the read/write heads. Usually these are firmly attached to an aluminum cast part which forms the drive assembly. Therefore, the best possible thermal interface is determined by the surface means on the perimeter of the drive assembly, which also serve the purpose of mounting. However, as the surface means of the drive assembly usually indicate surface-irregularities, it is required to structure the attachment in such a manner, that the side-wall-surface-means press the thermal conductive oscillation-attenuating-layer onto the surface means of the drive assembly with sufficient pressure, in order to achieve a good surface contact with the drive assembly. These circumstances are assisted by the fact that the same measure is required in the herein above described high-frequent oscillation attenuation. Thereupon, the combination of both constructive measures do not contradict. It has revealed in the framework of this invention, that an oscillation-attenuating-layer with good thermal conductive features and a width of about 0.45 mm is enough to sufficiently attenuate, equalize the surface irregularities with appropriate attachment pressure and achieve a highly efficient thermal conduction onto the assembly unit. Within the framework of this invention the application of an aluminum material is preferred for the assembly unit. The aluminum assembly with its good thermal path to the drive assembly, creates a significant enlargement of the data storage device's cooling surface. As such, an assembly unit fabricated with aluminum serves the additional purpose of a heat-sink besides supporting a disc drive. As long as the assembly unit is at least partially arranged within the air circulation of the housing, this passive cooling method is sufficient for most of the disc drive models in the middle performance range.

In the framework of this invention it is useful to apply a silicone-gummed ribbon shaped isolation material as oscillation-attenuating-layer. However it is also bearable in mind that the silicone material is laminated directly onto the assembly unit. Further a lamination of the drive assembly surface-means on the perimeter of the drive assembly may also be considered. The variety of layer geometry as set forth below, will further on be referred to as oscillation-attenuating-layer.

Within the framework of a further embodiment of the invention, the cooling-force may now be elevated step wise depending on the requirements. According to the preferred embodiment of the invention, the cooling-force is elevated by supplementing the assembly unit, which is allocated to the drive assembly, with cooling-fins or heat-sinks. It is useful that these cooling elements at least partially project into the air stream generated by the main fan(s) of the housing. In the framework of this invention the cooling fins are preferably arranged on the outer sides of the assembly unit. Thereby, the heat conducted away by the side-wall-surface-means of the assembly unit, is conducted with the shortest possible path into the cooling elements. Assembly units fabricated with copper or other good thermal conductive materials are also bearable in mind. It proved to be advantageous within the framework of this invention to either attach the assembly unit in direct metallic surface contact with distinct embodied heat-sinks by screw bolts or to apply assembly units with integrated cooling fins. If the heat sink and the assembly unit are individual components, it is advantageous in terms of assembly to structure the assembly unit as a singular component. If the cooling fins are integrated into the assembly unit it is advantageous to structure the assembly unit as two components. Aluminum profiles are to be considered as optimum. Within the framework of the various different examples as set forth below, it will become apparent that the assembly unit allocated to the drive assembly may also exclusively only serve the purpose of supporting the cooling elements. Thereby, the assembly unit does not always compulsively serve the purpose of simultaneously supporting a data storage device.

In the framework of a further embodiment of the invention, an additional elevation of the cooling force may be achieved by, alternatively or additionally to the previously mentioned heat-sinks, applying a fan which is mounted onto a side-wall-surface-means of the assembly unit. For this purpose, a group of holes are arranged on the side-wall-surface-means above and below the disc drive, which in total forms a passage for the air stream generated by the fan. As to guide the complete air stream generated by the fan through the passage, a gasket is arranged as support between the side-wall-surface-means and the fan. Thereby, the vendor prescriptions of maintaining an air stream above and below the disc is fulfilled.

The fastening means for the fan, gripping into the side-wall-surface-means of the assembly unit are supported directly on the fan and guided through holes in the gasket. It is useful to arrange threads or self cutting threads in the side-wall-surface-means of the assembly unit for this purpose. If the fastening means of the drive assembly are supported on torque-momentum-distributor-bridges, the gasket has to indicate at least one passage on one side for the bridge. Thereby, a sufficient air stream is achieved above and below the data storage device. In the maximum extended construction of the cooling method as described herein above, the invention permits a failure of the data storage device fan at an ambient operating temperature of 40° C. without that even the present most powerful 1 inch height disc drives will exceed their maximum rated thresh hold temperatures. However, the fact that it is possible to maintain the most powerful disc drives with intact cooling system, even at the vendor specified thresh hold temperatures for maximum life time, up to the most extreme ambient temperatures, seems to be far more important. As such hereby, a decisive contribution to the life time of the disc drive is achieved. This cooling method is not limited to 1 inch height disc drives. With adapted geometric embodiments, this method is also applicable to 1.6 inch (and greater) height disc drives available on the market and of course any other type of motor driven data storage device.

In a further embodiment of the invention, it is advantageous in respect to environmental considerations, to renounce the application of sandwich foam-linings arranged on the inner sides of the housing. In order to maintain the so far achieved noise emission specs, it evolves as necessary to reduce the number of noise sources within the housing and seize further measures. As already described in the introduction, the fans and in particular a plurality of fans in the computer, also cause noise. According to the state-of-the-art the CPU is cooled passively with a heat-sink. Thereby, a CPU fan is omitted. Furthermore the additional fan located in the air-inlet of the housing is omitted. Due to an advantageous embodiment of the passive disc drive cooling method the disc drive fan will eventually be dispensable.

In a further embodiment of the invention, the heat-sink is integrated with the assembly unit allocated to the drive assembly. The simplest embodied structure of such assembly unit is for example composed of two aluminum U-profiles, each of which are firmly attached to the damper-carrier-surface at the front face. The assembly of the data storage device is accomplished in the so far described manner between the two bottoms of the U-profiles. The shanks of the U-profiles each form a nearly complete hollow shaft above and below the data storage device in lateral direction. Considering air-flow and noise, the remaining gap between the sides of the U-profiles are to be neglected.

If the type of housing mentioned previously comprises one or more data storage device(s), as described herein above, which are allocated to one or more assembly units, it is recommended that the assembly unit forms a hollow shaft around the data storage device, that the space between the upper and lower side of the data storage device to the corresponding inner sides of the hollow shafts are dimensioned in such a manner that $\lambda/4$ of the highest acoustic frequency is not exceeded and that the construction forming the hollow shaft around the data storage device indicates low resonance properties so as to avoid acoustic stimulation of the hollow shaft.

Thereby, an unfolding of the noise pressure in full power within the hollow shaft is suppressed. Particularly all those sound waves are concerned, which unfold perpendicular from the data storage device surfaces. The upper-spectrum-waves are remnant as a remainder of the disturbing acoustic magnitude, which will then still be perceived as a gentle rustle. In the field of electric acoustics, the upper spectrum remnant due to filtering with high-pass filters is also known as pink noise. The $\lambda/4$ dimensioning of the hollow shaft thereof is a mechanical high-pass filter in accordance to the invention. This mechanical $\lambda/4$ high-pass filter thereby induces a strong attenuation of the stimulated air media, stimulated by the data storage device, in the immediate ambience of the data storage device surfaces. The effect of this measure is so powerful that sandwich foam linings are now dispensable. Thereupon, air-vent channels as described further on, may now be guided from the noise source through a partially reflecting cut-off surface at the end of the hollow shaft directly to the outside, without impairing the so far achieved low-noise emission. In consequence the $\lambda/4$ dimensioning simultaneously enables a convenient maintenance of an optimum guided cooling air-stream above and below the data storage device, directly from the ambience to the interior. The cut-off surface my be formed by the damper-carrier-surface.

The air inlet of the housing is now accomplished by a plurality of aligned holes through the damper layers and the surface means in such a manner that the data storage device and assembly unit directly receive fresh cooling air from the outside of the housing. Thereby, one group of holes emerge on the outside of the U-profile hollow shaft and the others inside the hollow shaft. The advantage is, that an air stream is now simultaneously maintained across all surfaces of the data storage device and the cooling assembly- unit. Already with this embodiment a powerful cooling force is achieved with the least investment of material, as for example aluminum, and a far lower velocity of air circulation.

Thereupon, in accordance to the invention, no fan is any longer necessary for the cooling of even the most powerful disc drives. Of course, the cooling-force may be further elevated by adding cooling fins to the U-profiles. Further on, the advantage of this embodiment is that the required volume space in the housing and the weight of the assembly unit is strongly reduced. Due to the omission of a fan for the purpose of cooling the disc drive, the development of noise is further reduced. In the best instance, only one main fan remains in the power supply which maintains an air flow within the housing.

It is in particular of advantage, due to an improvement of the support-force distribution of the disc unit onto the dampers, if the application of an even softer damper material is made possible. The attenuation factor in relation to the chassis may be further elevated with a softer damper material. This is of advantage for a higher attenuation of the irregular head oscillations.

In a further embodiment of the invention, the data storage device is now supported completely free between two dampers. It is now of advantage, that fastening means no longer have to penetrate the supporting-surface. In this instance two suited supporting-surfaces which are arranged on two opposite facing sides of the drive assembly are necessary. The carrier-surface and fastening-surface-oscillation-dampers are now cast parts which in addition encompass each of the damper-carrier and fastening-surface on all sides. The supporting-surfaces which are arranged facing opposite to each other, comprise sleeves that are either integrated or additionally arranged, which again encompass each of the carrier-surface and the fastening-surface-oscillation-dampers on all sides. If the damper-carrier-surface is a distinct component and located at the front side of the data storage device, a suitable opening for the bus and power connector has to be aligned in each of the corresponding supporting-surface, the damper-fastening-surface and the fastening-surface-oscillation-damper. In order to achieve the counter-coupling conditions, the supporting-surfaces arranged facing opposite to each other, are required to maintain a mechanical stiff relation with each other. In the simplest instance this condition is achieved with a suitable cuboid shaped housing. Any other construction, such as an open one, may also fulfill this purpose. Two sides of the cuboid housing each of which are positioned opposite to each other, form the suitable supporting-surfaces for the carrier-surface-oscillation-damper and the fastening-surface-oscillation-damper. The remaining four sides of the cuboid then form the sleeves for the dampers. As the data storage device is now supported freely between the dampers, this arrangement also allows oscillations horizontally to the damper plane. In order to achieve counter-coupling for the horizontal oscillations as well, it is required to arrange the damper-extensions encompassing the data storage device, asymmetrically in their width. Thereupon, this embodiment is identical with the so far discussed, in terms of possible unfolding of their effects. As the weight load is now supported on two opposite facing sides of the drive assembly, it is a given possibility to apply even a softer damper material or to reduce the contact surfaces of the dampers. This leads to a further elevation of the damping factor against the housing. As previously explained, the aligned holes through the layers opposing each other, take care of the appropriate venting. It is of further advantage, that the cuboid shaped housing now forms another hollow shaft in such a manner, that the outer air stream is also guided to the outlet of the corresponding supporting-surface of the fastening-surface-oscillation-damper without mixing with the warmed up air. An advantageous side effect of the cuboid shaped housing is, that the inventive embodiments and the data storage device are now able to form a closed and therewith ESD protected unit.

Finally the herein above described embodiments lead to the conclusion that at least parts of the invention may be integrated parts of the data-storage-device-housing itself.

BRIEF DESCRIPTION OF THE DRAWINGS

As set forth below, the invention is displayed and described in detail by 11 application examples as well as the appended drawings. Displayed are:

FIGS. 18 and 17 versus the application example in accordance to FIGS. 16 and 17, a further developed data storage device unit, whereby the data storage device is arranged in an assembly unit composed of two assembly-unit parts, conducted with the application of an oscillation-attenuating layer;

FIGS. 23 and 24 a top view of the carrier-surface and fastening-surface-oscillation-dampers with compensation holes;

FIGS. 25, 26 and 27 several top views of the carrier-surface and fastening-surface-oscillation-dampers arranged with aligned holes, in accordance to FIGS. 6 and 7, which enable a cooling air-flow through the damper system;

DESCRIPTION OF THE PREFERRED EMBODIMENTS

Figure 1:
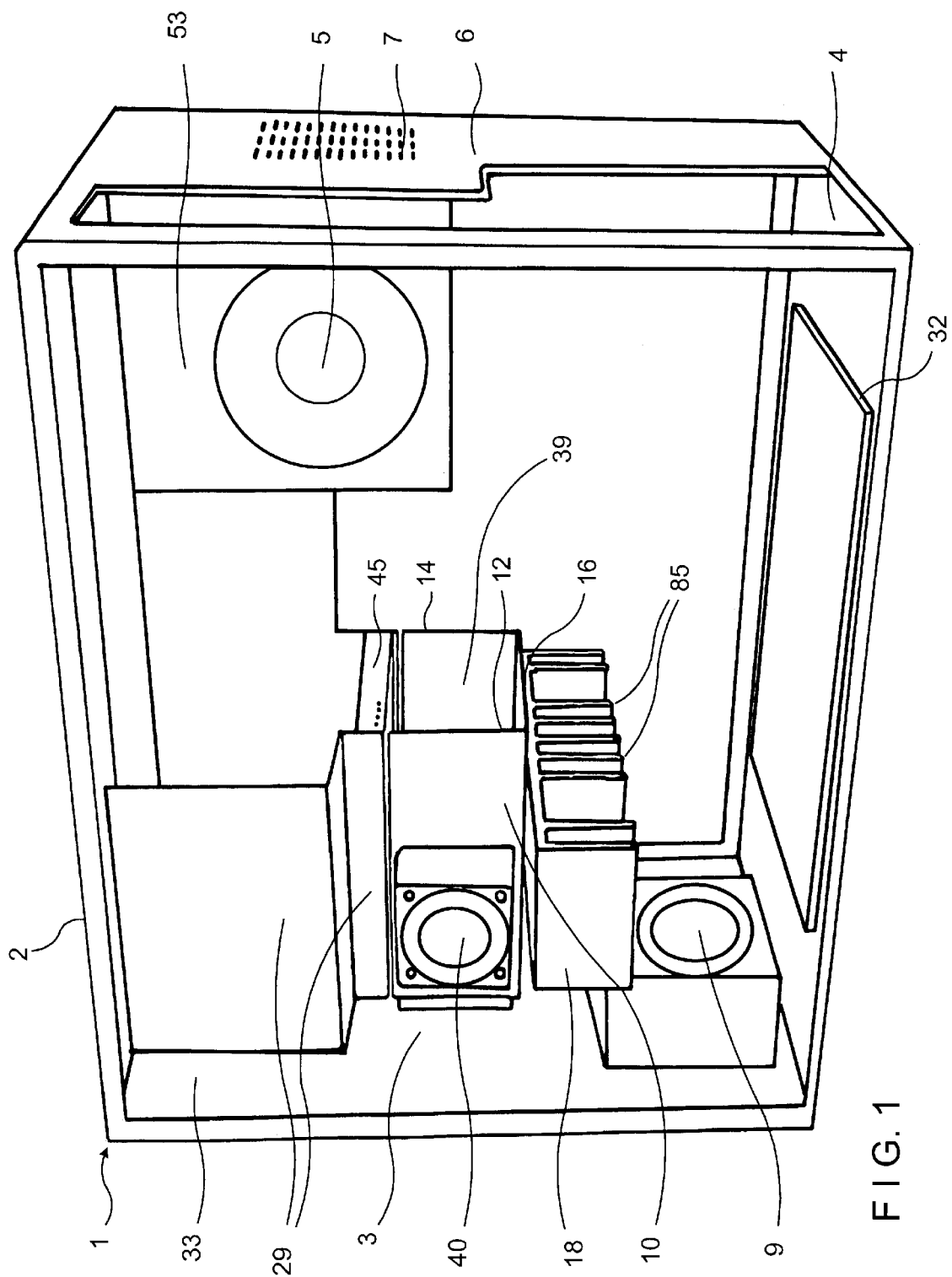
FIG. 1 a perspective view of a housing in accordance to the invention after detaching the housing lid.

At first a housing related to the FIGS. 1, 2, 3, 8 and 23, 24 is described, comprising sound-proofing and/or shock-proofing in accordance to the invention with a—in the special instance a motor driven data storage device 20 represented by a—disc drive. As in a total, a cuboid shaped housing referred to with 1, made of common sheet metal, has a frame 2 with a front panel 33. The front side of panel 33 comprises non displayed operating elements, as well as an attached bottom panel 4. A main fan 5, is installed in the upper rear of the housing 1, which blows the inner air out of housing 1, through a power supply 53, and further on through vents 7 located in the rear panel 6. The add-on fan 9, which is arranged on the lower part of the front panel 33, sucks outer air through non displayed vents in the front panel 33 and blows the air into the inner of housing 1. With the arrangement of the main fan 5 and the add-on fan 9, the cooling air-stream is roughly guided in diagonal manner through the inner of housing 1. The cage 29 comprises a floppy-disc assembly with installed floppy-disc 45.

Figure 2:
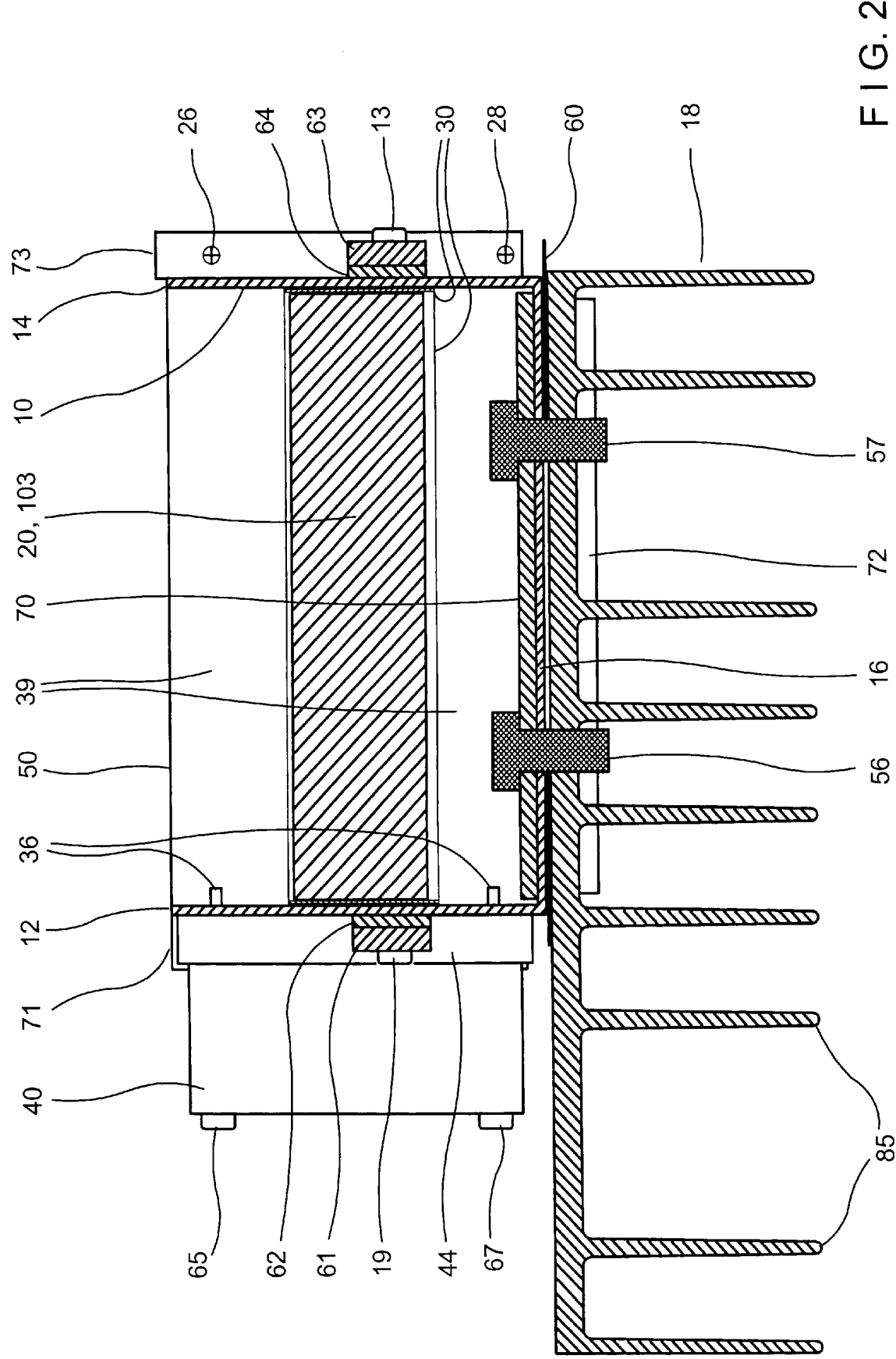
FIG. 2 a cross sectional rear view of a data storage unit, comprising a fan, gasket, assembly unit, damper-carrier-surface, data storage device, oscillation-damping and thermal-conductive layer, fastening means of the drive assembly, heat-sink, fastening means of the heat-sink with a cross section through the fastening means of the heat sink, and a cross section through the fastening means in the middle of the drive assembly.
Figure 3:
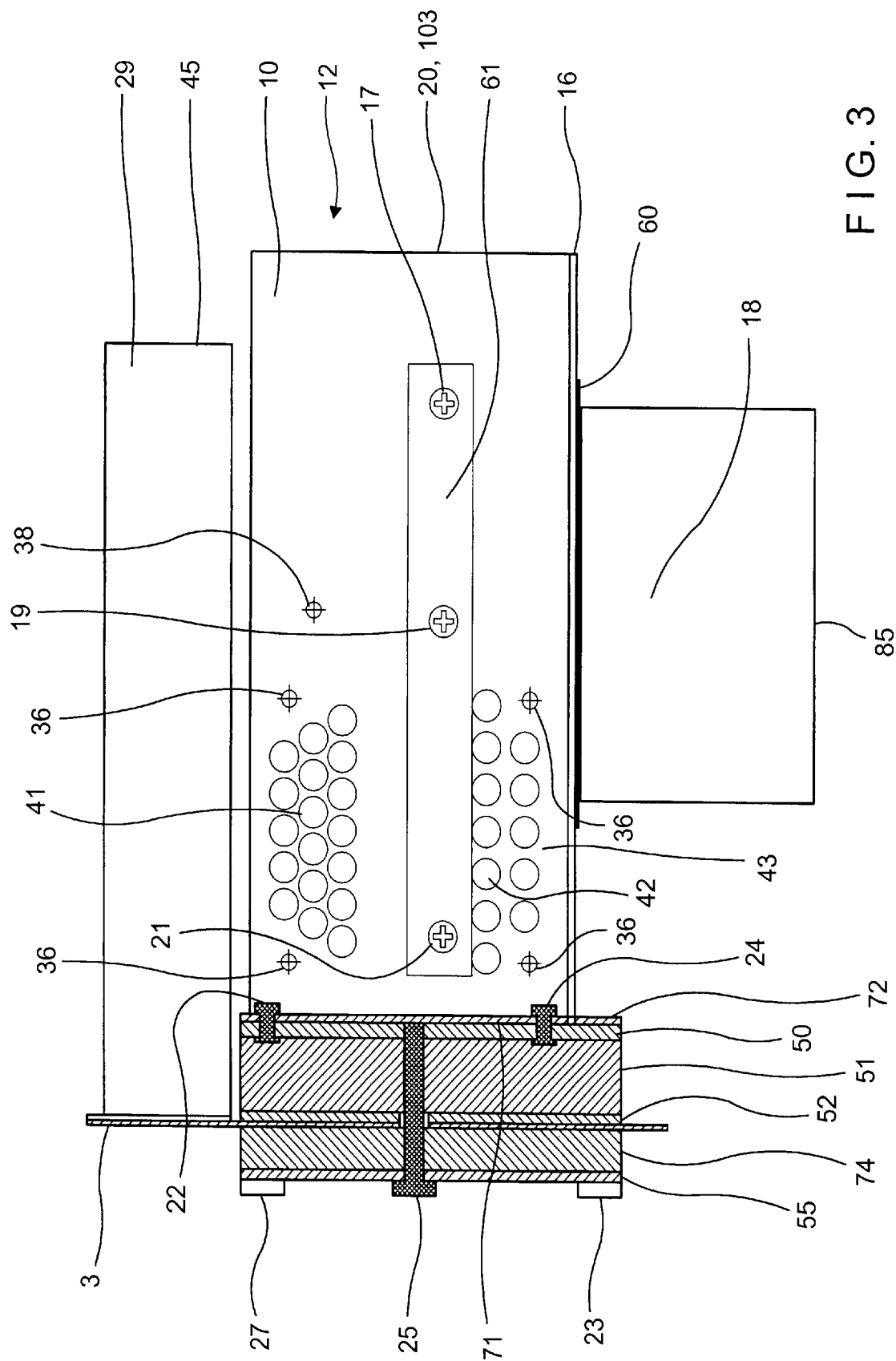
FIG. 3 a side view of the assembly unit without fan, which is attached to the front panel of the housing with the push-pull damper system suitable for low frequencies, whereby the damper-carrier-surface, the carrier-surface-oscillation-damper, the reinforcement panel, the fastening-surface-oscillation-damper, the damper-fastening-surface and an assembly screw are displayed in cross sectional view.

A cage shaped assembly unit 10, as displayed in this instance by FIGS. 2 and 3, comprises a side-wall-surface-means 12, with fastening edge 71, side-wall-surface-means 14 on the opposite facing side of side-wall-surface-means 12 with fastening edge 73, a hollow-shaft-bottom 16 with fastening edge 72, which are attached to the damper-carrier-surface 50 with rivets 22, 24 gripping into the fastening edge 71 and with rivets 26, 28 gripping into the fastening edge 73 and with non displayed rivets gripping into the fastening edge 72. A data storage device 20 is supported between the side-wall-surface-means 12 and 14 of the assembly unit 10 with screws 11, 13, 15, 17, 19, 21. The data storage device 20 comprises amongst other, drive assembly 103, a non displayed drive motor driving the drive media at the usual high revolutions and a non displayed actuator servo driving the read/write heads.

The herein above described unit comprising an assembly unit 10 with a damper-carrier-surface 50 and therein installed data storage device 20, is attached to the supporting-surface 3 with reinforcement panel 52, as in particular illustrated by FIG. 3, in such manner that a carrier-surface-oscillation-damper 51 is arranged between a damper-carrier-surface 50 and a supporting-surface 3 with reinforcement panel 52. The surface of the carrier-surface-oscillation-damper 51 essentially ranges across the total surface of the damper-carrier-surface 50 and separates it from the supporting-surface 3 with reinforcement panel 52 in terms of body oscillations. The fastening means 23, 25 and 27 embodied as screws and gripping into the damper-carrier-surface 50, are supported on a damper-fastening-surface 55 and a fastening-surface-oscillation-damper 74 which is arranged between the damper-fastening-surface 55 and the outside of the supporting-surface 3, serve the purpose of assembling the unit as described herein above. The surface of the fastening-surface-oscillation-damper 74 essentially ranges across the total surface of the damper-fastening-surface 55 and separates it from the supporting-surface 3 in terms of body oscillations. The well movable fastening means (screws) 23, 25, 27 are isolated against the supporting-surface 3 and the reinforcement panel 52.

The damper 51 has a layer width of about 8 mm and the damper 74 has a layer width of about 16 mm. Both dampers 51 and 74 are identically composed of a semi-elastic soft material. Therewith, both dampers 51 and 74 have excellent attenuating properties in the lower frequency spectrum. The fastening means (screws) 23, 25, 27, gripping into the damper-carrier-surface 50, keep both dampers 51 and 74 sustained under slight pressure, upon reaching their end position during assembly. The end position of the fastening means 23, 25, and 27 are formed by the fastening edges 71, 72, and 73 of the assembly unit 10. Thereupon, the herein above described sustaining pressure caused by the fastening means 23, 25, and 27, generates a virtually stiff connection between the damper-carrier-surface 50 and the damper-fastening-surface 55.

Due to the dimensioning of dampers 51 and 74, the low-frequent oscillations caused by the data storage device 20 are now well attenuated against the supporting-surface 3 with reinforcement panel 52. The supporting-surface 3 is now only subjected to a remainder of the oscillation energy which is attenuated by the damper 51 and the damper 74. Thereupon, the oscillation energy which is transferred to the frame 2 and thereby onto the complete housing 1 is reduced to a minimum. In particular self oscillation of the data storage device 20 is reduced to a minimum.

Figure 8:
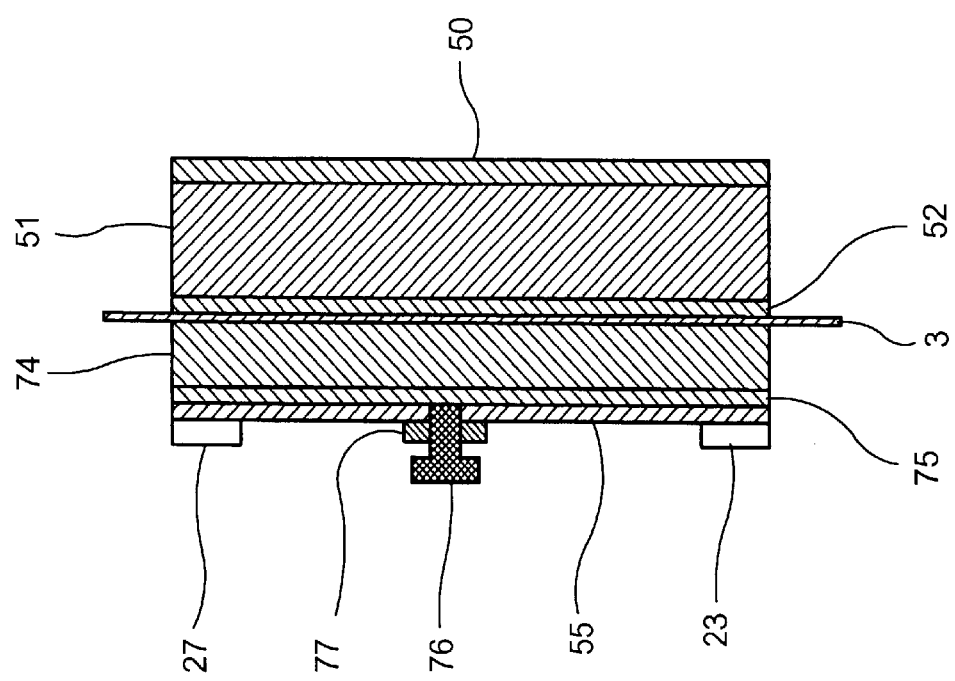
FIG. 8 a cross sectional cut-view through a tunable damper system with magnified scale in comparison to FIG. 3.

In a further embodiment of the herein above described push-pull attenuation, the phase-shift of the damper system is facilitated adjustable as displayed in FIG. 8, which allows an optimizing of the herein above described push-pull coupling. A tuning panel 75 is inserted between the damper-fastening-surface 55 and the fastening-surface-oscillation-damper 74. The tuning panel 75 comprising non displayed drill holes is guided by the non displayed shafts of the fastening means 23, 25, 27. A drill hole not displayed in detail with a thread extension 77, is located in the geometric middle of the damper-fastening-surface 55. The adjustment screw 76 gripping into the thread extension 77, penetrates the damper-fastening-surface 55 and is supported on the tuning panel 75. By turning the adjustment screw 76, the tuning panel 75 is projected away from the damper-fastening-surface 55. This causes a modification of the layer width of the damper 74 and the damper 51. Analog, as displayed in FIG. 12, the tuning panel 75 is arranged adjustable on the averted outside of the supporting-surface 3.

The previously described arrangement of the assembly unit 10, comprising a supported data storage device 20 and further components as set forth below, which is composed of: damper-carrier-surface 50, carrier-surface-oscillation-damper 51, reinforcement panel 52, supporting-surface 3, fastening-surface-oscillation-damper 74 and fastening means 23, 25, and 27, form a crank-bearing or "pivot" with slight swivel-angles in vertical and horizontal direction to housing 1 due to the elasticity of the two dampers 51 and 74. If housing 1 is bumped from the outside, the two dampers 51 and 74 simultaneously act as shock absorbers for the safety of data storage device 20, because the assembly unit 10 with supported data storage device 20 may carry out an attenuated swivel movement in vertical as well as horizontal direction.

With for example a layer width of 16 mm for the carrier-surface-oscillation-damper 51 and a layer width of 8 mm for the fastening-surface-oscillation-damper 74, it has proven that shocks subjected to the housing 1 in vertical direction are absorbed up to 90%, or reach the data storage device 20 reduced by the power of ten. In particular the dangerous slew rates of a deceleration are moderated substantially. In total this enables a slightly stronger deceleration applied onto the data storage device 20. A shock of 30 g subjected to housing 1 is equivalent to a shock of 3 g at the data storage device with strongly moderated slew rate. This measure is sufficient to effectively safe guard the data storage device 20 against typical shocks onto housing 1 which may occur in a realistic every day office environment.

In order to achieve a rectangular position of the herein above described data storage device unit in relation to front panel 33, the two dampers 51 and 74 comprise compensation holes 31 for the support load distribution in accordance with FIGS. 23 and 24.

As in particular indicated by FIG. 2, a broad oscillation attenuating layer 30 is aligned between the drive assembly 103 and the assembly unit 10, all around the surface means 100 of the drive assembly 103, and along the two side-wallsurface-means 12, 14 as well as along the damper-carrier-surface 50. The broadness of the oscillation attenuating layer 30 is essentially equivalent to the height of data storage device 20 and if good surface contact is given, it induces an attenuation of the data storage device 20 in the high-frequent acoustic spectrum. Layer 30 is preferably fabricated semi-elastic indicating fully reversible de-formable properties To de-couple the body oscillation of the data storage device 20 against the assembly unit 10, the screws 11, 13, 15, 17, 19, 21 gripping into the drive assembly 103, are supported on the assembly unit 10 by the two torque-momentum-distributor-bridges 61 and 63, and the oscillation de-coupling hard-rubber underlay 62 which is located between the torque-momentum-distribution-bridge 61 and the side-wall-surface-means 12, and the oscillation de-coupling hard-rubber underlay 64 which is located between the torque-momentum-distribution-bridge 63 and the side-wall-surface-means 14. The two hard-rubber underlay 62, 64 and the two torque-momentum-distributor-bridges 61, 63 each of which are equivalent in their surfaces, are displayed in detail in FIGS. 19, 20 and 21, 22. A plurality of concentric extensions 37, erecting from the surface of the hard-rubber underlay 62, project into the non displayed drill holes of the side-wall-surface-means 12 and 14. Concentric to the extensions 37, the underlay 62 is provided with hole passages 35 for the screws 11, 13, 15, 17, 19, and 21. The concentric extensions 37 prevent a contact between the screws 11, 13, 15, 17, 19, 21 and the two side-wall-surface-means 12, 14. If the screws 11, 13, 15, 17, 19, and 21 are tightened, the two torque-momentum-distributor-bridges 61, 63 compress the two hard-rubber underlay 62, 64 and the two side-wall-surface-means 12, 14 and the oscillation attenuating layer 30 onto the surface-means 100 on the perimeter of drive assembly 103 in a rigid and two-dimensional manner. Thereupon, the high-frequent acoustic oscillations of the data storage device 20 are attenuated by the layer 30, and de-coupled from the assembly unit 10 by the two hard-rubber underlay 62, 64. The attenuated high-frequent oscillations of the data storage device 20, are now only able to radiate from the top side 78 and the non displayed bottom side of the data storage device 20, into the adjacent air media within the housing 1.

A hollow shaft 39 is formed around the data storage device 20, by the side-wall-surface-means 12, 14, the hollow shaft bottom 16, the damper-carrier-surface 50 and the cage 29 comprising floppy-disc 45, with its opening projected to the rear panel 6 of housing 1. Thereupon, the remnant portion of high-frequent sound radiated into the air by the data storage device 20, is reflected away from the front panel 33 with direction to rear panel 6. Now, a further noise reduction may be achieved if lid 8 of housing 1 with its three sides is at least partially lined from the inside with sound absorbing sandwich foam linings 46, 47, 48, 49, in accordance to FIG. 9. The foam linings are each composed of one layer bitumen, one layer foam and one layer polyurethane. Another sandwich foam lining 32 is applied to the bottom panel 4 of housing 1 in accordance to FIG. 1.

Measurements in a low-sound-reflection cabin with sonar hard surface between the capture microphone and the computer, equipped with: housing 1 including lid 8 in accordance to the invention, 4 fans, and a 1 inch height disc drive of the model Seagate Cheetah™ ST34501W (10.000 RPM), has proven that in 1 m distance to the non displayed front panel lid of the closed housing 1, an operating noise level of 36 dB(A) was registered without disc accesses. Upon continuously accessing the disc drive, a noise level of 37 dB(A) was registered. Without add-on fan 9 and disc drive in idle mode, a noise level of only 32 dB(A) was registered.

The previously mentioned silicone gummed isolating material, with a width of 0.45 mm, implemented as oscillation attenuating layer 30, in addition indicates good thermal conductive properties as concluded by its thermal conductivity of 0.0021 cal/cm s ° C. Therewith, the silicone gummed isolating material not only invokes an excellent attenuation for high-frequent body oscillations, but also an additional thermal conduction, immediately into both side-wall-surface-means 12, 14 of the assembly unit 10, for the heat dissipated by the data storage device 20. Thereupon, the acoustic surfaces related to the data storage device 20 are reduced as previously described and simultaneously the thermal surfaces related to the data storage device 20 are enlarged. If assembly unit 10 is fabricated with aluminum material and at least partially arranged within the air flow of main-fan 5 and fan 9, already a disc drive of medium power is well cooled passively. In such instance the assembly unit 10 with side-wall-surface-means 12, 14 and hollow-shaft bottom 16 acquires the character of a heat-sink.

Enhancing measures for the elevated cooling of data storage device 20 are achieved by attaching a heat-sink 18, with a plurality of cooling fins 85, to the hollow-shaft-bottom 16 of side-wall-surface-means 12, 14 with good thermal contact. The screws 56, 57 and further non displayed screws or a plurality of such fastening means, gripping into the heat-sink 18, are supported on a torque-momentum-equalizer-panel 70 located on the inner side of the hollow-shaft-bottom 16 and due to the sufficient torque-pressure an efficient thermal contact is provided between hollow-shaft-bottom 16 and heat-sink 18. Thereupon, a main heat path is formed, whereby the heat is conducted with the shortest possible distance from the surface-means 100 on the perimeter of drive assembly 103 across layer 30, the side-wall-surface-means 12, 14 of assembly unit 10, the hollow-shaft-bottom 16 directly into heat-sink 18. In case of demand, a thermal conductor 60 may be inserted between hollow-shaft-bottom 16 and heat-sink 18. The thermal conductor 60 may be composed of any adequate material serving this purpose. As displayed particularly in FIG. 1, the cooling fins 85 of heat-sink 18 are located at least partially within the diagonal cooling air flow of main fan 5 and add-on fan 9 with the mentioned intake vents on the lower part of front panel 33 and the mentioned exhaust vents 7 on rear panel 6. Heat-sink 18 contributes essentially to the thermal relief and thereby to the cooling of data storage device 20.

As an alternative to heat-sink 18 or as additional elevation of the cooling-force, a disc fan 40 is mounted onto side-wall-surface-means 12 from one side of the data storage device 20. An appropriate passage opening is necessary on side-wall-surface-means 12, as to conduct the air flow of the disc fan 40 onto data storage device 20. As displayed in FIG. 3 a group of fan passage vents 41 and 42 are located above and below the data storage device 20. Between the passage holes of group 42 are spaces 43, still allowing adequate thermal flow through the metal in this area of side-wall-surface-means 12 into the hollow-shaft-bottom 16. Further more, self-cutting threads 36 are provided on side-wall-surface-means 12 for the fastening of disc fan 40. As FIG. 2 reveals, the fan fastening means 65, 67 as well as further non displayed fastening means, gripping into the self cutting threads 36 on the side-wall-surface-means 12, are directly supported on disc fan 40. A gasket 44 is located between fan 40 and side-wall-surface-means 12, which conducts the air stream completely through passage holes 41 and 42. The fastening means 65, 67 as well as further non displayed fastening means are guided through the gasket 44. If the data storage device 20 is attached with torque-momentumdistributor-bridges 61, 63 and correlating underlay 62, 64, an appropriate non displayed passage is necessary on at least one side of gasket 44. In correlation to the previously mentioned hollow shaft 39 around the data storage device 20, an air stream is now maintained across the total top-side 78 and non displayed bottom side of the data storage device 20. As fan 40 is located near to the add-on fan 9 and thereby nearest to the non displayed air intake, the data storage device 20 is cooled effectively with non pre-warmed up fresh air. Side-wall-surface-means 12 comprises a thread 38 for the attachment of a non displayed thermal-sensor if necessary, enabling thermal surveillance.

The so far described assembly of the data storage device 20 in housing 1 with oscillation dampers, is achieved by allocating the arrangement of the oscillation dampers to one side of the data storage device 20, whereby the carrier-surface-oscillation-damper 51 and the fastening-surface-oscillation-damper 74 are arranged on two opposite facing sides of the supporting-surface 3 of housing 1. In this special instance, the supporting-surface 3 is formed by the— sufficiently rigid—front panel 33 of housing 1.

Figure 4:
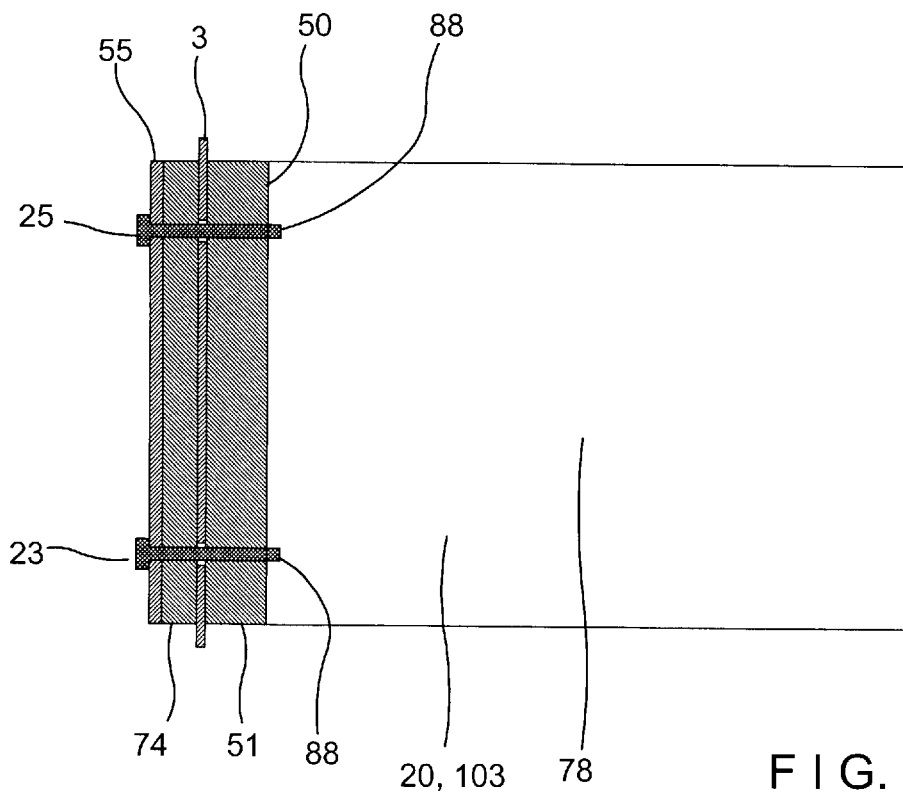
FIG. 4 a schematic view of a simplified assembly unit, versus the application example of FIGS. 2 and 3, whereby the carrier-surface-oscillation-damper is directly attached to the data storage device without insertion of an individual damper-carrier-surface.

This basic concept of data storage device 20 assembly is illustrated in a simplified embodiment by FIG. 4, where the damper-carrier-surface 50 is not realized by a distinct component, but rather formed by the data storage device 20 itself. This connotes that the carrier-surface-oscillation-damper 51 is directly attached adjacent to an outer surface of the drive assembly 103 in a two dimensional manner. This simplified assembly method is possible, in particular with vertically assembled disc drives of 1.6 inch body height or more. In such instances, due to the body height of a disc drive, such drives provide sufficient large outer surfaces for a direct contact with dampers. The fastening means 23, 25, 27 grip into threads 88, which are punched into the body of the disc drive housing. The end position of the fastening means 23, 25, 27 are determined by the immersing depth of threads 88.

Figure 5:
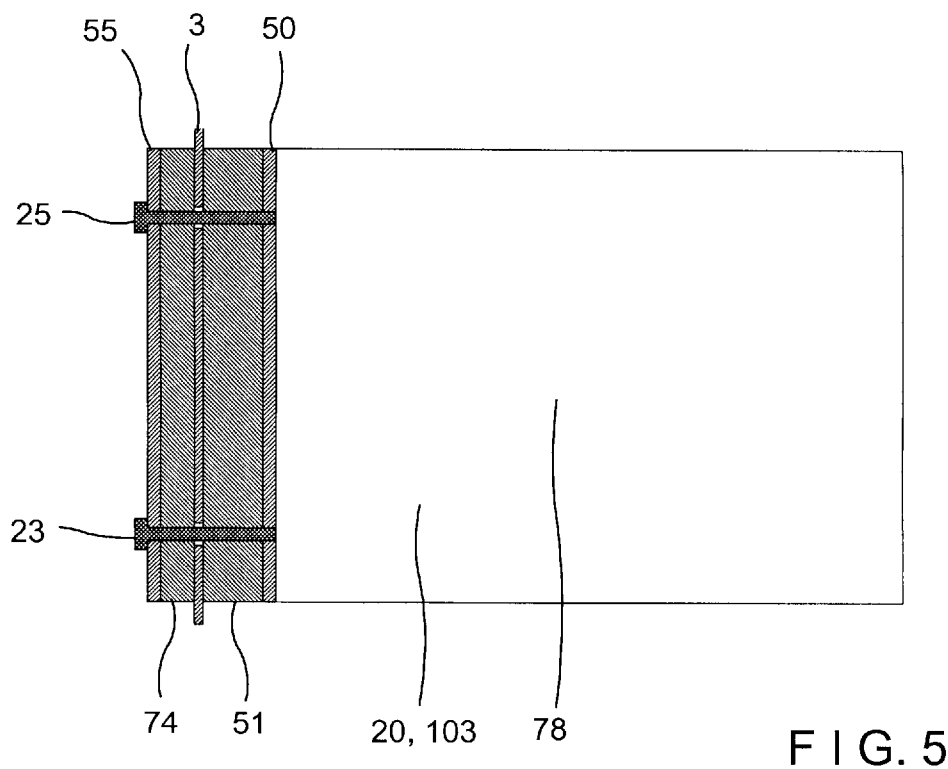
FIG. 5 a data storage device unit, where the carrier-surface-oscillation-damper is connected to the damper unit with a distinct damper-carrier-surface, which simultaneously forms a part of an assembly unit.

The data storage device 20 assembly illustrated in FIG. 5 is provided in contrary to the latter with a distinct damper-carrier-surface 50, in the appearance of the displayed individual panel, which itself is or is part of an individual assembly unit, mechanically linked to the drive assembly 103 with non displayed screws. Here, the fastening means 23, 25, 27 grip into non displayed threads, which are immersed into the damper-carrier-surface 50. The end position of the fastening means 23, 25, 27 is formed by the side surface of the drive assembly 103.

Figure 6:
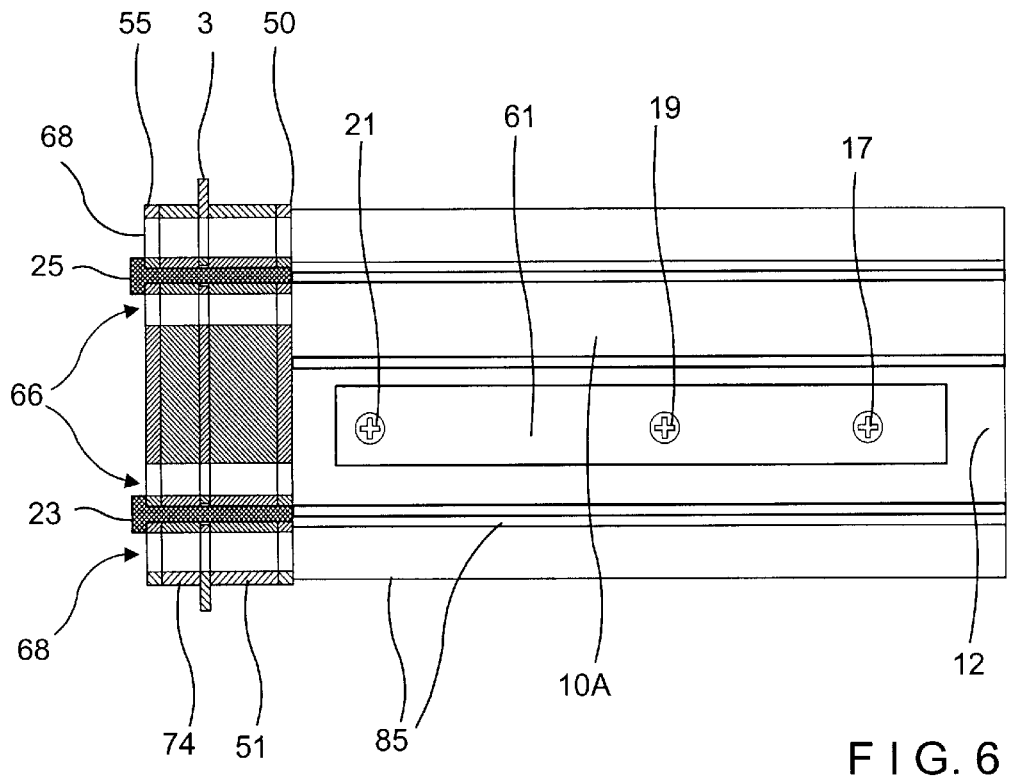
FIGS. 6 and 7 a side view and a rear view of an alternative application example of a data storage device unit, versus the example described in connection with FIGS. 3 and 2, comprising a disc assembly unit with two in cross-section U-shaped parts, which support the data storage device and form hollow shafts across the bottom and top of the data storage device.
Figure 7:
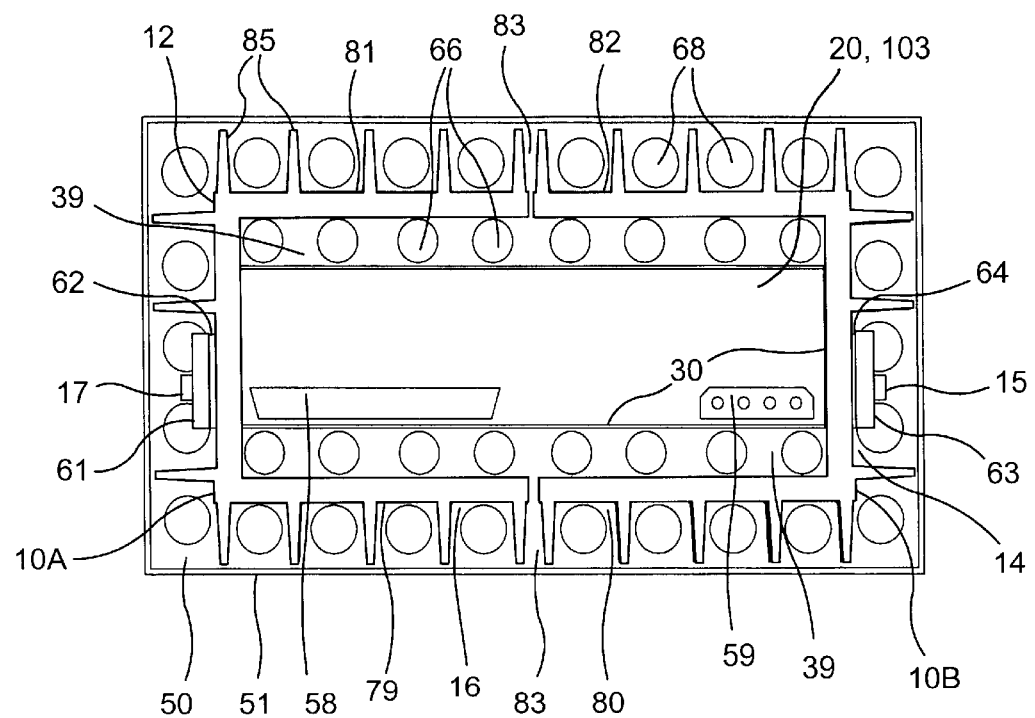

In FIGS. 6 and 7 the basic assembly concept, of the described application examples as displayed in FIGS. 2, 3 and 5, is altered by arranging the data storage device 20 within an assembly unit 10 consisting of two components, with each of their assembly unit parts 10a and 10b basically shaped in cross section as a U-profile, which are pushed over the opposite facing long sides of data storage device 20 with the shanks 79, 80, 81, 82 across the top-side 78 and the bottom of the data storage device 20. With cooling fins 85 provided on the outer sides of assembly-unit-parts 10a and 10b, the heat-sink 18 is the proclaimed integrated part of assembly unit 10. The non displayed fastening edges of assembly-unit-parts 10a and 10b, are here formed by each of the front faces of the assembly-unit-parts 10a and 10b. The damper-carrier-surface 50 is attached firmly to the front faces of assembly-unit-parts 10a and 10b with non displayed screws. The end position of the fastening means 23, 25, 27 is formed by the front faces of the assembly-unit-parts 10a and 10b.

The assembly unit 10, which is composed of the assembly-unit-parts 10a and 10b, is proportioned in its inner perpendicular dimension in such a manner, that a hollow shaft 39 is formed between each of the respective top-side 78 and the bottom side of the data storage device 20 and the respective surfaces facing to the inner sides of assembly unit 10, which are formed by the shanks 79, 81 of part 10a and the shanks 80, 82 of part 10b of the assembly unit 10. If the oscillation dampers 74 and 51 are provided with drill holes 66 and 68, as illustrated in the FIGS. 25, 26 and 27, whereby at least the panel shaped damper-fastening-surface 55 (the embodiment in accordance with FIGS. 6 and 7) as well as the individual damper-carrier-surface 50 consecutive to the carrier-surface-oscillation-damper 51, are allocated with aligned openings or drill holes 66 and 68, then the hollow shaft 39 is vented with air pulled in through the front side of the assembly unit 10. Thereby, the aligned inner drill holes 66 provided in the individual parts of the damper system, form channels which lead into the hollow shafts 39. The drill holes 68 allocated on the outer area, guide the air which is pulled in through front panel 33 into housing 1, along the outer sides of the assembly-unit-parts 10a and 10b of the assembly unit 10 as well as possible cooling fins 85 integrated into assembly unit 10. The bus connector 58 and the power connector 59 provided on the rear side of the data storage device 20, are permanently accessible due to the open rear of the assembly unit 10. A gap 83 is located between the shanks 81 and 82 which form the hollow shaft 39 on the top side 78 of the data storage device 20, and the shanks 79 and 80 which form the hollow shaft 39 on the bottom side of device 20. The manufacturing tolerances of data storage device 20, assembly unit 10 and layer 30 is compensated with the gap 83. The gap 83 is proportioned as small as possible so as to prevent sound pressure escaping through gap 83.

FFT analysis on a disc drive rotating with 10000 RPM, indicated that the highest relevant disturbing acoustic noises occur up to a frequency of 9 KHz. Under the aspect that the perpendicular inner distance between the top-side 78 and the bottom side of the disc drive does not exceed $\lambda/4$ of the highest expected disturbing acoustic frequency, an advantageous inner perpendicular distance of 8 mm for the hollow shafts 39 was determined for this application example. The drill holes 66 which lead into the hollow shaft 39 are smaller in proportion as the drill holes 68. The remnant surface of the damper-carrier-surface 50 after deducting the blank spaces of the drill holes 66 (FIG. 7), induces a partial reflection of sound waves traveling into the direction of drill holes 66.

Further on, it particularly revealed as advantageous in the herein above described application example to construct assembly unit 10 in such a manner, that assembly unit 10 indicates low resonance properties. This objective was excellently fulfilled with in cross section shaped U-profile assembly-unit-parts 10a and 10b, indicating a material width of 4 mm.

Figure 9:
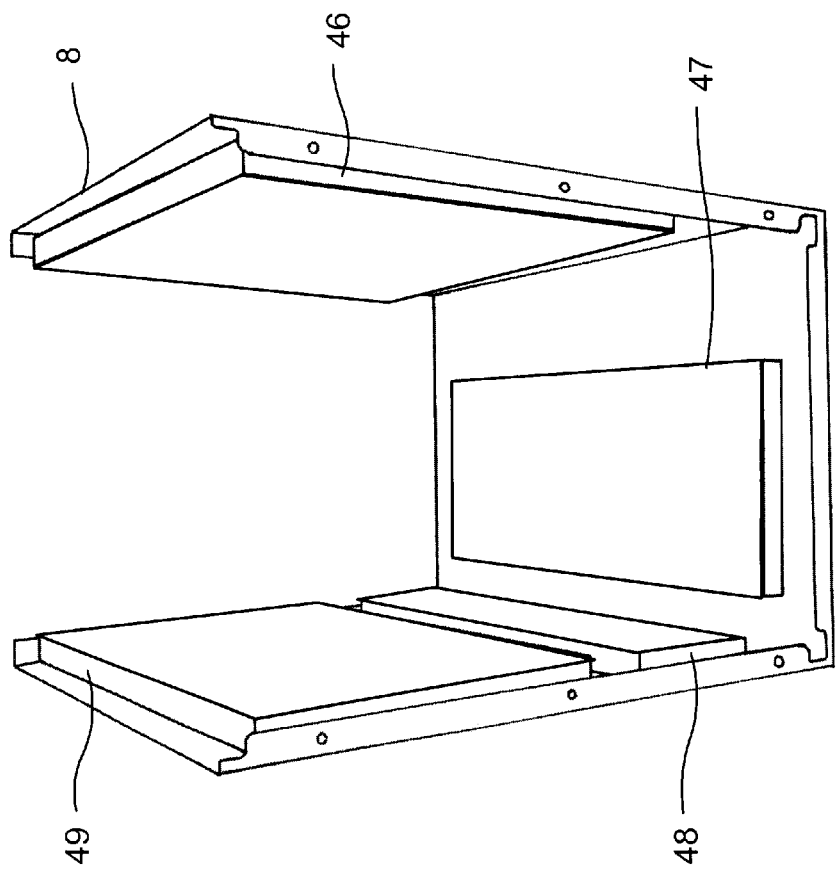
FIG. 9 a perspective inner view of the housing lid with sandwich foam linings for sound absorption.

An additional improved sound proofing of housing 1 is displayed in FIG. 9, by lining the inner sides of the lid 8 with adhesive sandwich foam linings 46, 47, 48, 49 and the bottom panel 4 with adhesive sandwich foam lining 32. This is an additional possibility of sound proofing which will be dispensable based on the herein above described measures. Noise analysis on the previously described embodiment, with the previously mentioned measuring conditions, without the application of sandwich foam linings 32, 46, 47, 48, 49 and exclusively only applying one main fan 5, the operating noise excluding disc drive accesses revealed to be only 30 dB(A).

Figure 10:
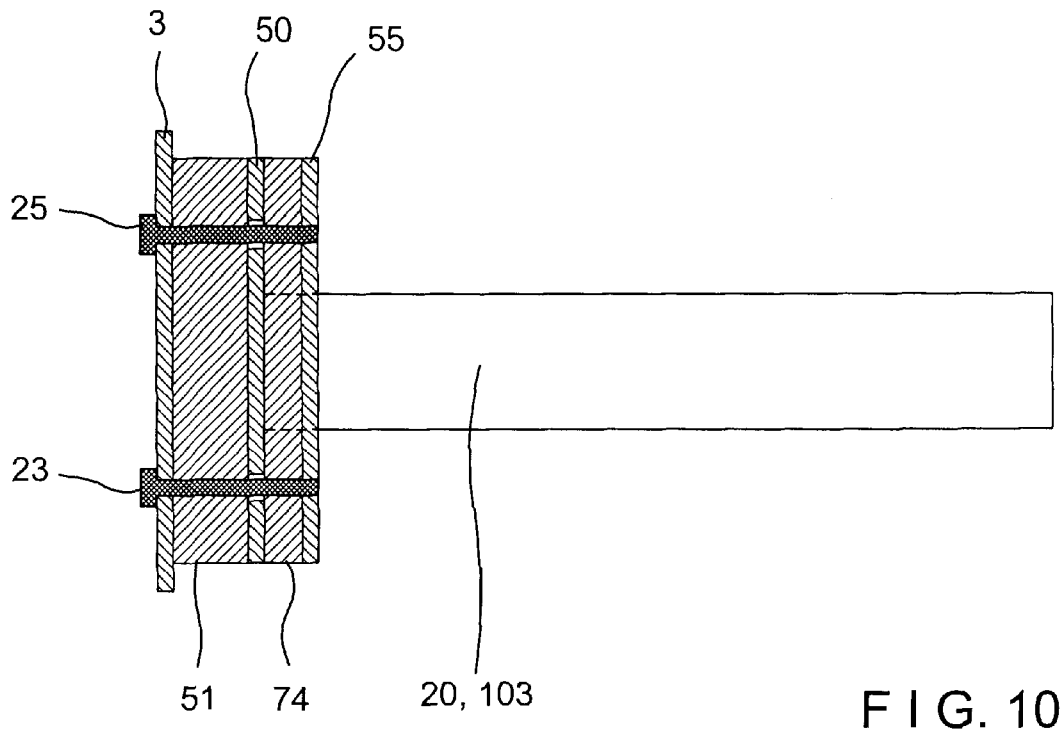
FIGS. 10 and 11 a side and rear view of a data storage device with a damper system arranged on its rear face surface, whereby the mounting surface is arranged on the data storage device's averted outer side of the carrier-surface-oscillation-damper. Hereby the data storage device is connected to the damper-carrier-surface through an aligned passage opening in the damper-fastening-surface and fastening-surface-oscillation-damper.
Figure 11:
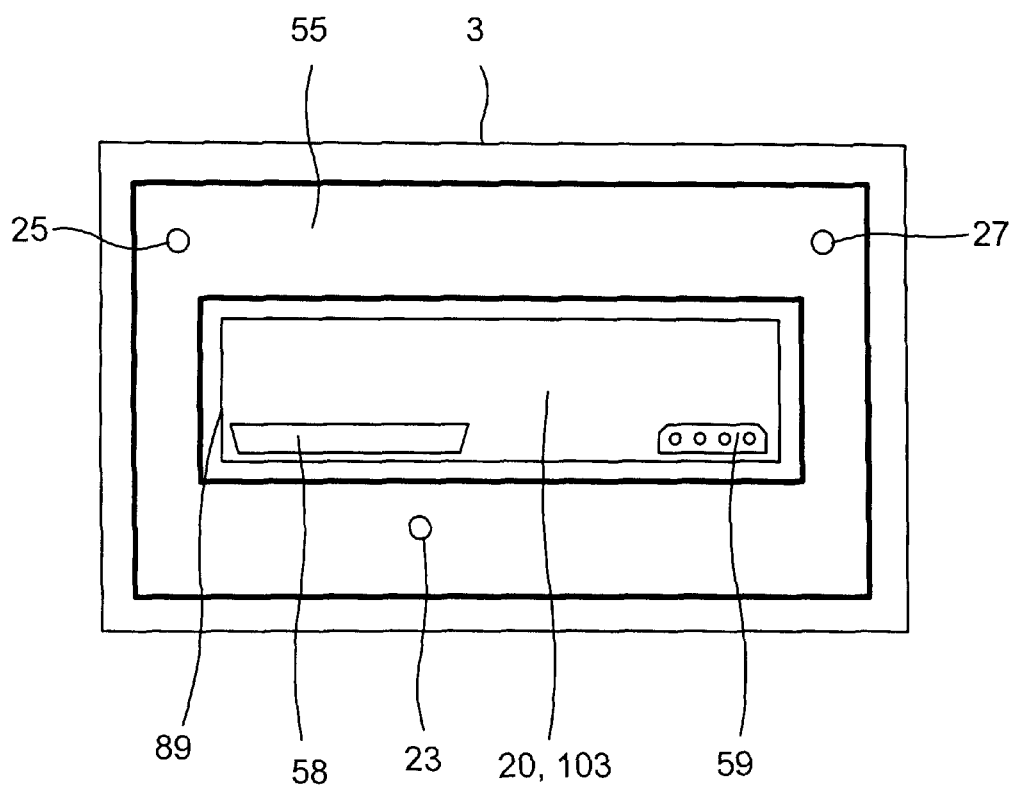
Figure 28:
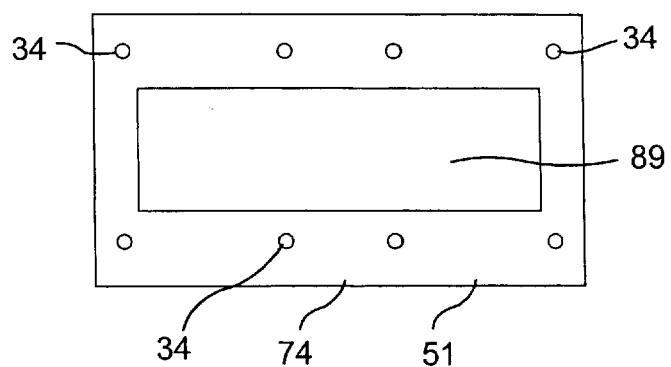
FIG. 28 a top view of an oscillation-damper, configured as the fastening-surface-oscillation-damper, as for example applied in the application example displayed in FIGS. 10 and 11.

A second category of disc assembly with a damper system, is illustrated in accordance with the application examples of FIGS. 10 and 11. The damper-carrier-surface 50 is mechanically linked to the rear of drive assembly 103 with non displayed screws, or is an integrated part of the drive assembly 103. Carrier-surface-oscillation-damper 51 and fastening-surface-oscillation-damper 74 are arranged on the opposite facing sides of damper-carrier-surface 50. The supporting-surface 3 and the damper-fastening-surface 55 form the two outer assembly surfaces. A passage opening 89 is provided for the data storage device 20 in the damper-fastening-surface 55 and the damper 74. Dampers as displayed in FIG. 28 are applied here.

Figure 13:
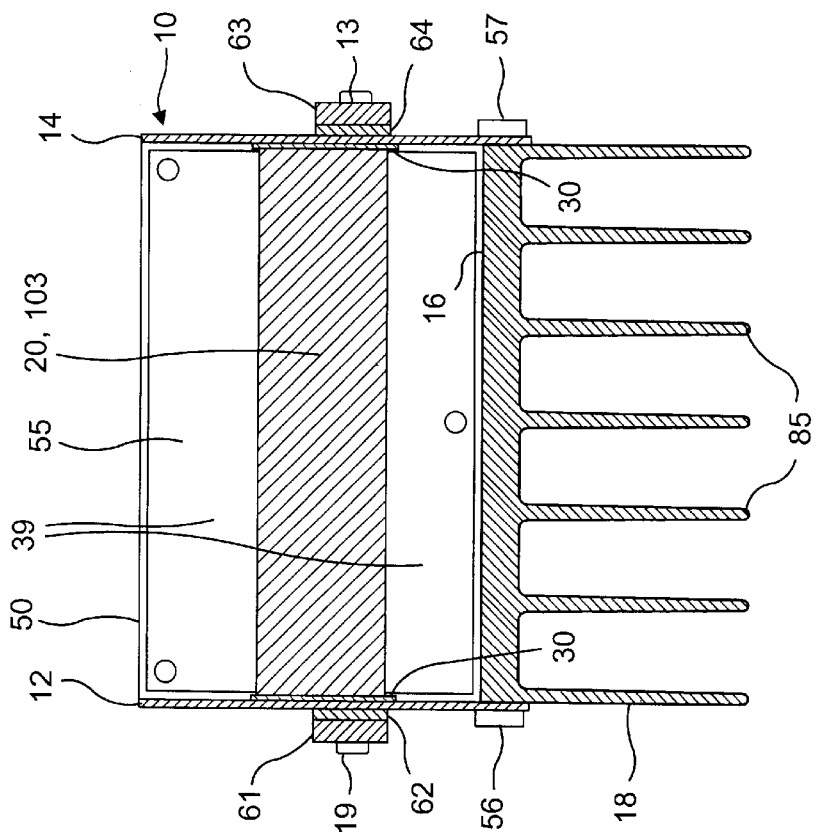
FIGS. 12 and 13 a top and cross sectional view, in accordance with the cut direction of FIG. 3, of a construction with the corresponding functions of the damper system displayed in FIG. 10, where the data storage device is supported by the damper-carrier-surface without a break-through passage opening in the damper-fastening-surface and the fastening-surface-oscillation-damper.
Figure 12:
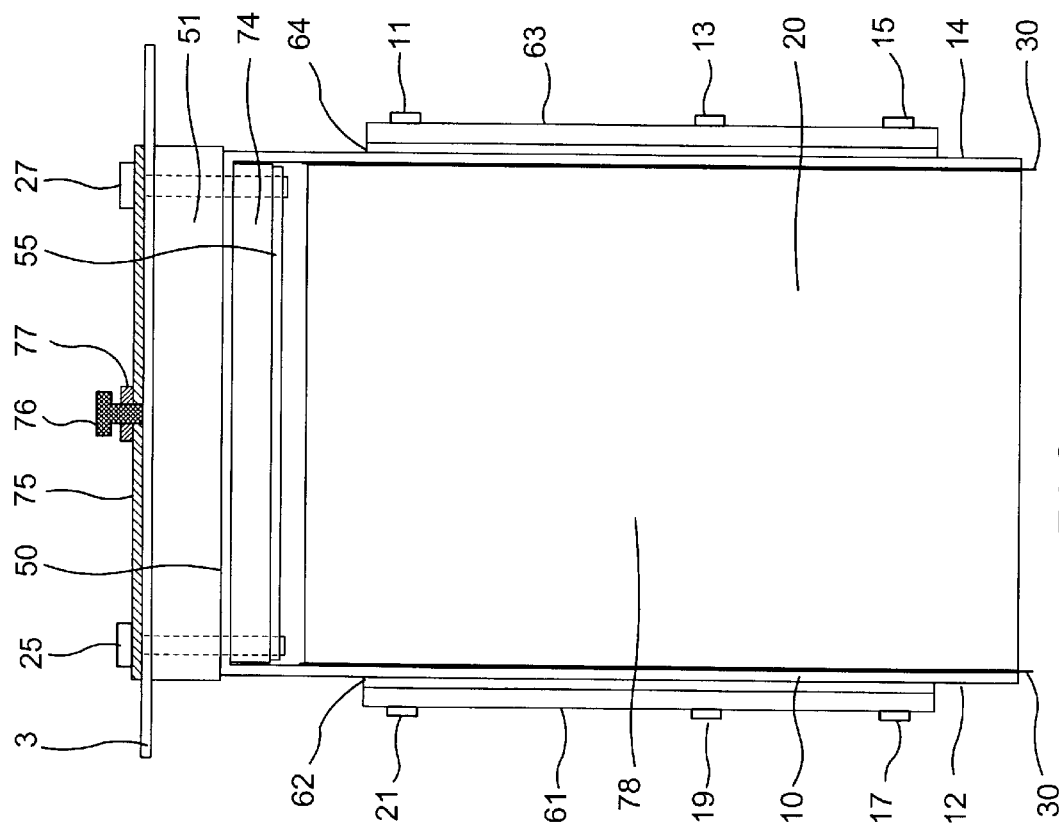

A further possible data storage device assembly, identical in function with the previous embodiment, comprising a damper system in accordance with the second category, is illustrated by the application example of FIGS. 12 and 13. As in particular precisely displayed by FIG. 12, the assembly unit 10 may also be shaped by a broad surfaced U-sheet metal. The side-wall-surface-means 12 and 14 are formed by the two shanks of this U- and the bottom part of the U- now forms the damper-carrier-surface 50 which is integrated with assembly unit 10 and indicating sufficient distance to the non displayed rear side of the drive assembly 103. The damper-carrier-surface 50 is also here supported between the damper 51 and the damper 74. The damper-fastening-surface 55 is also here situated at the averted rear of damper-carrier-surface 50 and is there supported by the damper 74, arranged on the rear side of damper-carrier-surface 50. The fastening means (screws) 23, 25, 27 are either supported on the supporting-surface 3 or on a further inserted tuning-panel 75. The damper 51 is also here located between the damper-carrier-surface 50 and supporting-surface 3. This alternative construction is recommended if the space between front panel 33 and the non displayed front lid is too narrow. In result, the data storage device unit projects deeper into the inner of housing 1.

As in particular displayed in FIG. 13, the side-wall-surface-means 12, 14 are directly attached to the sides of heat-sink 18 which fits between the side-wall-surface-means. Further it is bearable in mind that the side-wall-surface-means 12, 14 comprise fastening edges on their bottom, in order to attach a broad heat-sink 18 from the bottom. In both instances the hollow-shaft-bottom 16 is formed by the back of heat-sink 18

A third category of embodied damper systems, similar in concept with the so far described application examples, is illustrated as set forth below in conjunction with FIGS. 14, 15, FIGS. 16, 17, and FIGS. 17, 18. The support of the data storage device 20 by a carrier-surface-oscillation-damper 51 and a fastening-surface-oscillation-damper 74, allocated on two opposite facing sides of data storage device 20 or the drive assembly 103, is common to all of these application examples. As in the second category, the oscillation energy of drive assembly 103 is also here introduced into the dampers 51 and 74, between the two dampers 51 and 74.

Figure 14:
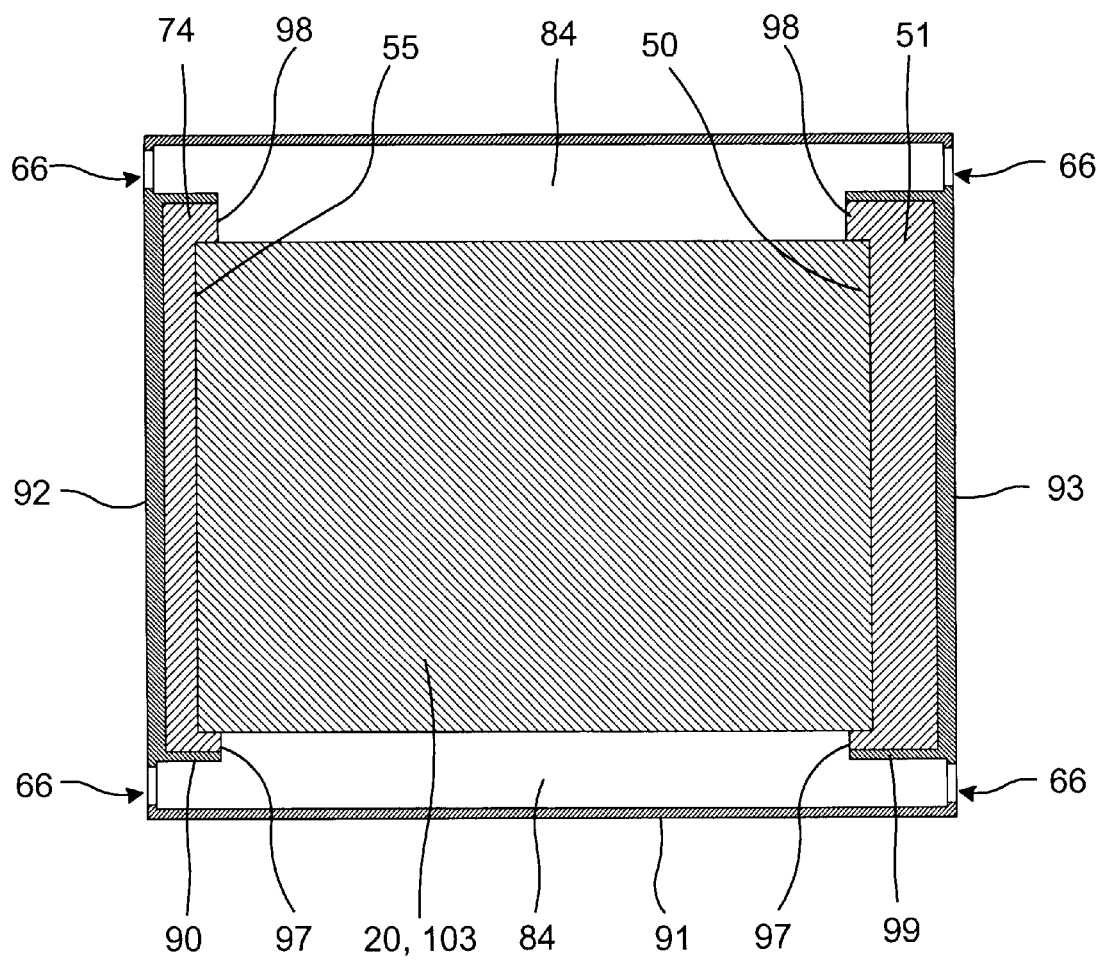
FIGS. 14 and 15 a cross sectional displayed top and rear view of a data storage device unit, whereby the carrier-surface-oscillation-damper and the fastening-surface-oscillation-damper of the damper unit are respectively each arranged directly adjacent onto the opposing sides of the data storage device.
Figure 15:
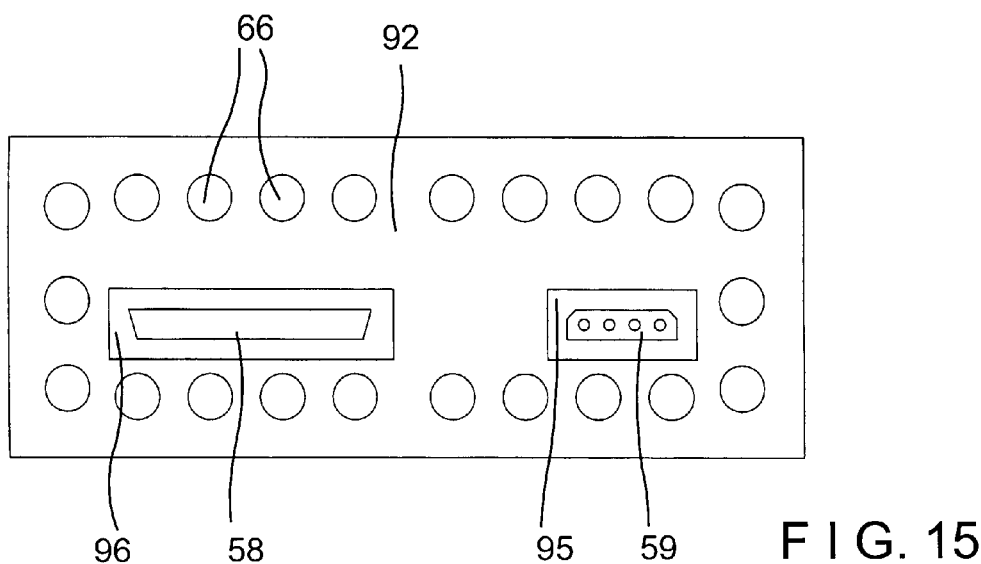

In the application example displayed by FIGS. 14 and 15, the dampers are now embodied as casted parts with circumfering extensions 97 and 98 on the perimeter, which encompass the data storage device 20 or the drive assembly 103 in direct contact respectively on two opposite facing sides. The damper-carrier-surface 50 and the damper-fastening-surface 55 are integrated, now formed by two opposite facing sides of the data storage device 20 or drive assembly 103 itself. The assembly unit in total referred to as 91 for the data storage device unit, connects two supporting-surfaces 92 and 93 situated on two opposite facing sides of the data storage device 20 or the drive assembly 103 of data storage device 20. The assembly unit 91 is displayed as cuboid housing. The oscillation dampers 51 and 74 are fixed onto the opposite facing sides of data storage device 20 or drive assembly 103, by sleeves 90 and 99 attached to the supporting-surfaces 92 and 93. The data storage device 20 or drive assembly 103 is supported between the oscillation dampers 51 and 74, sustained under at least slight pressure-tension. The drill holes 66 in the supporting-surfaces 92 and 93 protruding the rim area of the sleeve 90, 99 and oscillation dampers 51, 74 permit the flow of air, for the purpose of cooling the data storage device surfaces, through assembly unit 91 which is embodied as a closed housing here. As illustrated in FIG. 14, the extensions 98 and 97 are embodied asymmetrically in their layer width. This enables a counter-coupling of oscillations which are generated horizontally by the data storage device 20. As illustrated in FIG. 15, supporting-surface 92 and the consecutive fastening-surface-oscillation-damper 74 are provided with passage openings 95 and 96 for the power connector 59 and the bus connector 58 of the data storage device 20. The passage openings 95 and 96 are proportioned in such a manner that connectors 58 and 59 are unable to engage contact with supporting-surface 92. Further more, a particularly effective noise reduction is additionally achieved, if the assembly unit 91 is embodied by a housing, and the hollow shaft 84 thereby evolving around the data storage device 20, as already described in the application example FIGS. 6 and 7, is dimensioned with a perpendicular inner distance of $\lambda/4$ to the data storage device. Apart from that, the partial sound reflection now possible on both supporting-surfaces 92, 93, contributes immensely to the reduction of noise. This application example with exclusive air cooling validates for disc drives of low and medium performance.

Figure 16:
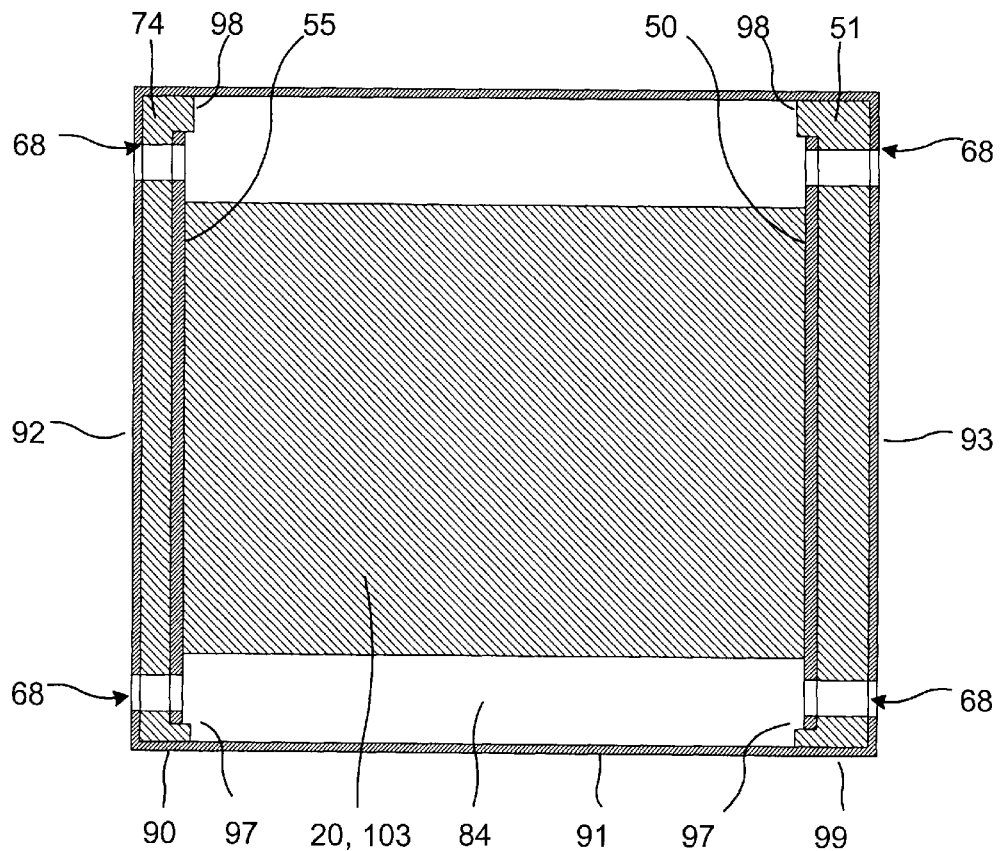
FIGS. 16 and 17 an application example with a functionally comparable solution as displayed in FIGS. 14 and 15, whereas the carrier-surface-oscillation-damper and the fastening-surface-oscillation-damper are allocated to opposite facing sides of the drive assembly, however whereby the dampers are connected to the data storage device with a distinct damper-carrier-surface and damper-fastening-surface.
Figure 17:
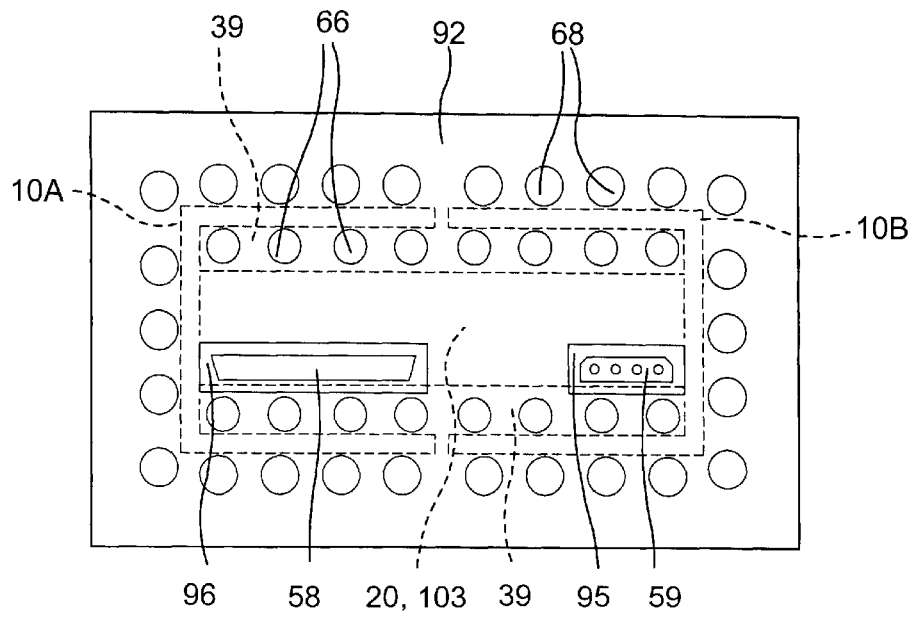
Figure 18:
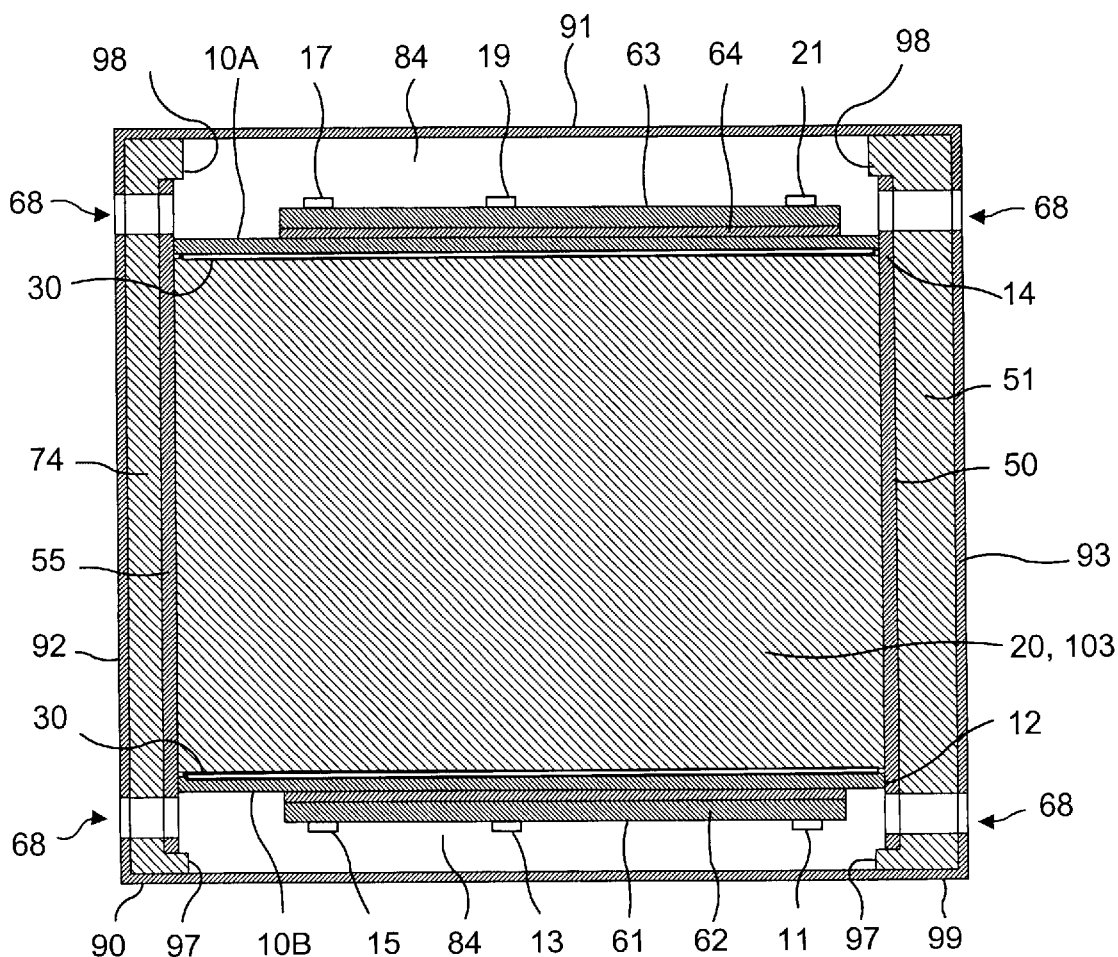
Figure 19:
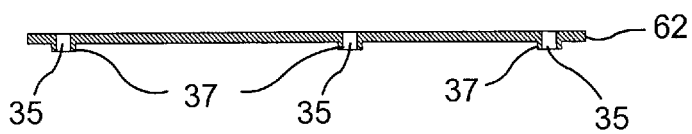
FIGS. 19 and 20 a schematic cross sectional top view of a hard-rubber underlay as oscillation de-coupling means of the data storage device fastening means, as may be applied in the application examples displayed in FIG. 18, FIGS. 12 and 13, FIGS. 6 and 7, and FIGS. 2 and 3.
Figure 20:
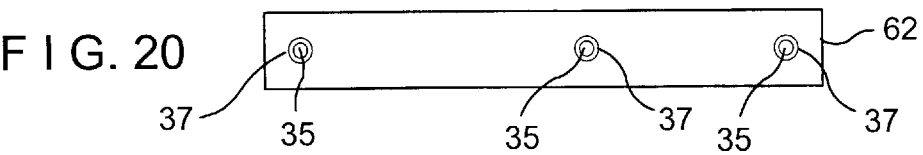

As displayed in FIGS. 16 and 17, the damper system of the assembly unit correlating to the data storage device 20 is modified therein, that the damper-carrier-surface 50 and the damper-fastening-surface 55 are embodied by distinct components which are mechanically linked to two opposite facing sides of data storage device 20 or the drive assembly 103. This application example is functionally related to the herein above described application example, whereby the encompassing of the casted oscillation dampers 51 and 74 with extensions 97 and 98 is directly achieved by the assembly unit 91, which forms an encompassing housing. In this instance, the necessary sleeves 90 and 99 are integrated parts of the assembly unit 91. The drill holes implemented for the air flow through the assembly unit in this application example are formed by appropriately aligned drill holes 66 and 68, in the damper-fastening-surface 55, and the damper-carrier-surface 50, and respectively the consecutive allocated oscillation-dampers 51 and 74, as well as the outer supporting-surfaces 92 and 93 of assembly unit 91. The supporting-surface 92, the consecutive fastening-surface-oscillation-damper 74 and the damper-fastening-surface 55 are provided with passage openings 95 and 96 for the power connector 59 and the bus connector 58 of the data storage device 20.

Figure 21:
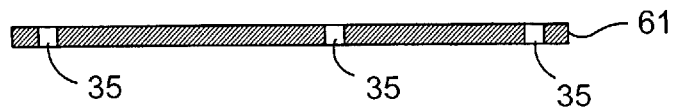
FIGS. 21 and 22 respective views of torque-momentum-bridges as support for the data storage device fastening means, which are applicable in conjunction to the hard-rubber underlay as displayed in FIGS. 19 and 20.
Figure 22:
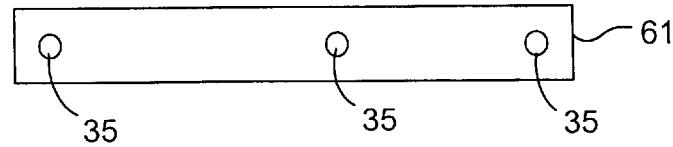

FIGS. 17 with 18 resembles a further developed application example in accordance to FIG. 16. Here the damper-carrier-surface 50 and the damper-fastening-surface 55 are distinct components, which are mechanically linked to the opposite facing sides of assembly unit 10, comprising the assembly-unit-parts 10a and 10b. As already described in correlation to FIGS. 6 and 7, the data storage device 20 is also here supported between the side-wall-surface-means 12, 14 of assembly unit 10 in conjunction with layer 30. The oscillation damping underlay 62, 64, as displayed in FIGS. 19 and 20, as well as the torque-momentum-distributorbridges 61, 63, as displayed in FIGS. 21 and 22, are applied here in the same manner as in the previous application examples. As long as the assembly unit 91 is embodied as a housing, the assembly unit 91 forms a hollow shaft 84 around the assembly unit 10. The aligned drill holes 68 and the hollow shaft 84 now maintain a regular air stream on the outside of assembly unit 10, which is not mixed with pre-warmed air of housing 1. If the assembly unit 10 is completed with cooling fins 85, as displayed in FIGS. 6 and 7, a maximum passive cooling-force is achieved within the framework of this invention. It is now particularly advantageous, that the cut-off surfaces, which are here formed by the damper-carrier-surface 50 and damper-fastening-surface 55 provided with drill holes 66, and arranged on the opposite facing sides of the hollow shaft 39 (FIG. 18), accomplish partial reflection of the remaining sound pressure radiated by the data storage device 20 on both sides of hollow shaft 39. Noise analysis revealed that the remnant noise emission is now mainly only determined by the main fan 5. In this application example the noise development measured with and without operating the data storage device 20, hardly makes a difference (as long as no accesses take place). It becomes obvious that a maximum of noise reduction is achieved by a λ/4 dimensioned hollow shaft 39 combined with two partially reflecting cut-off surfaces. The same result is achieved with the application example of FIGS. 6, 7, if an additional cut-off surface provided with drill holes 66 and passage openings 95, 96 for the connectors, is arranged on the rear side of assembly unit 10. It is furthermore obvious that the function of partial reflection is independent of possible further functions of the cut-off surfaces.

Further on, it particularly revealed as advantageous in the herein above described application example of the third category, to construct assembly unit 91 in such a manner that assembly unit 91 indicates low resonance properties. This objective was fulfilled excellently with an assembly unit 91 embodied as housing and fabricated with sheet metal at a width of 1.5 mm. The unit formed by the inventive embodiments and a data storage device 20 within the third category, may now for example be implemented as 5¼ inch standard device slot. Also the direct assembly onto supporting-surface 3 with aligned drill holes 66 and 68 is of advantage.

Figure 29:
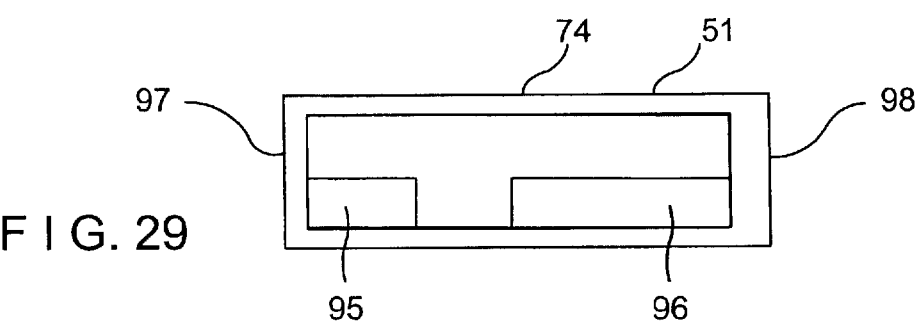
FIG. 29 a top view of a carrier-surface and fastening-surface-oscillation-damper, as applied in the application example in accordance to FIGS. 14 and 15, whereby passage openings are arranged for connectors of the drive.
Figure 30:
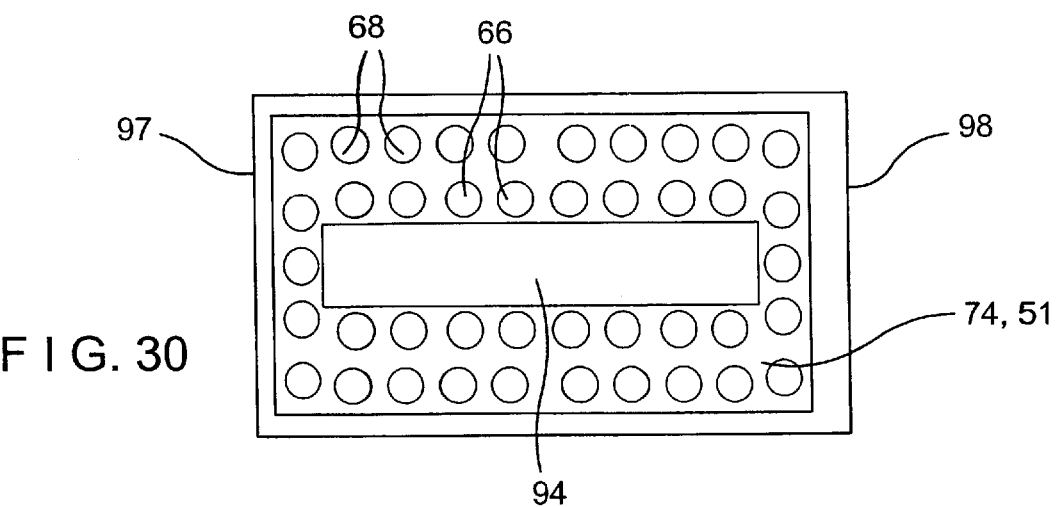
FIGS. 30 and 31 a top view of a carrier-surface and fastening-surface-oscillation-damper, as applied in the application example in accordance to the damper systems displayed in FIGS. 16, 17 and 18.
Figure 31:
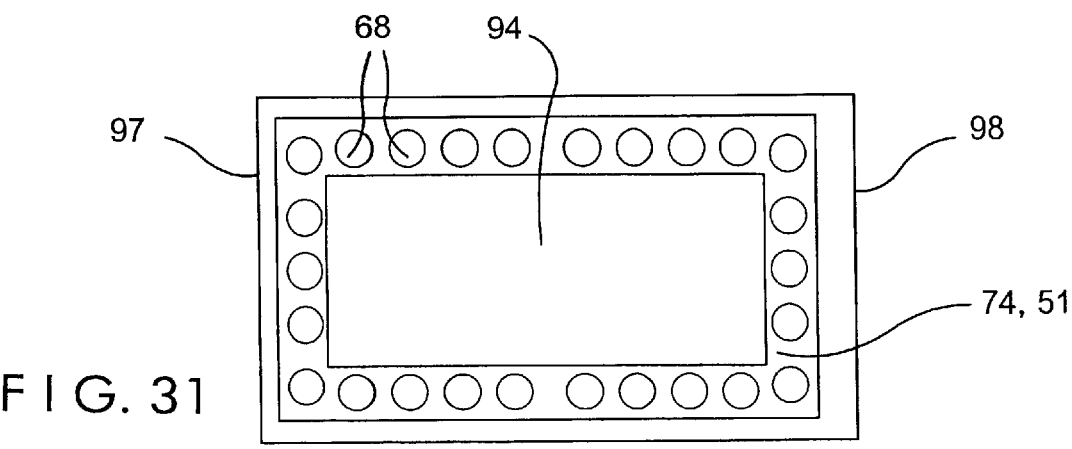

The oscillation dampers 74 and 51 embodied as casted parts, which are to be arranged on opposite facing sides of the data storage device 20 or drive assembly 103, as applied in the previous application examples are displayed with top views in the FIGS. 29 till 31. The contact surfaces of the oscillation dampers 74 and 51 may be varied on demand with a blank space 94 as displayed in FIGS. 30 and 31.

The achievable cooling-force for data storage device 20 with the application example in accordance to FIGS. 2 and 3, is determined by the dimensioning of heat-sink 18, assembly-unit 10, and implementation of fan 9 and/or fan 40. Measurements with the variety of dimensions applied within the framework of this invention revealed a maximum cooling-force of 1.25 K/W without fan 9 and 40, and with fan 9 and 40 a cooling-force of 0.75 K/W. In the application example in accordance with FIGS. 6 and 7 (only without fans) a cooling-force of 0.95 K/W was detected. In the application example in accordance with FIG. 18 even 0.85 K/W. With application examples in accordance to FIGS. 6, 7 and 18, it becomes obvious here, that without hesitation any disc drive up to 20W power consumption may be cooled under omission of fan 40, without the danger of exceeding the specified operating temperature.

It is clarified by the previous descriptions of the various application examples that assembly-unit 10 may be embodied by one or more parts and does not compulsively always find application as an assembly-unit for data storage device 20. It is obvious within the framework of the inventive considerations, that alternative and advanced constructions of the described application examples are realizable, whereby the assembly-unit 10 is only disposed as a heat-sink. Per definition within the framework of the inventive considerations, the damper-carrier-surface 50 and the damper-fastening-surface 55 are either integrated parts of the drive assembly 103 or distinct components which are mechanically linked to the drive assembly 103 or distinct components which are mechanically linked to an assembly-unit 10 or integrated parts of the assembly unit 10.

Further possible alternatives and advanced constructions of the described application examples are for example related to the geometric shape and embodiment of the oscillation dampers 51 and 74. Thereby, it is for example possible with the appropriate given shape, to embody the damper 51 and the damper 74, as partial areas of an oscillation damper constructed as integral unit. This would be useful i.e. for the application example of FIGS. 12, 13. If one imagines the top viewed arrangements there, as viewed from the side, the oscillation dampers 51 and 74 could merge into one part above and below the damper-carrier-surface 50, which is integrated into assembly-unit 10. The oscillation damper constructed as integrated unit thereupon contains an incision with the height of assembly-unit 10. This oscillation damper is then pulled over one of the two side-wall-surface-means 12, 14 and onto the damper-carrier-surface 50. There in position, the oscillation damper constructed as integrated unit, is functionally subdivided respectively by the damper-carrier-surface 50, again into each an oscillation damper 51 and 74.

Figure 32:
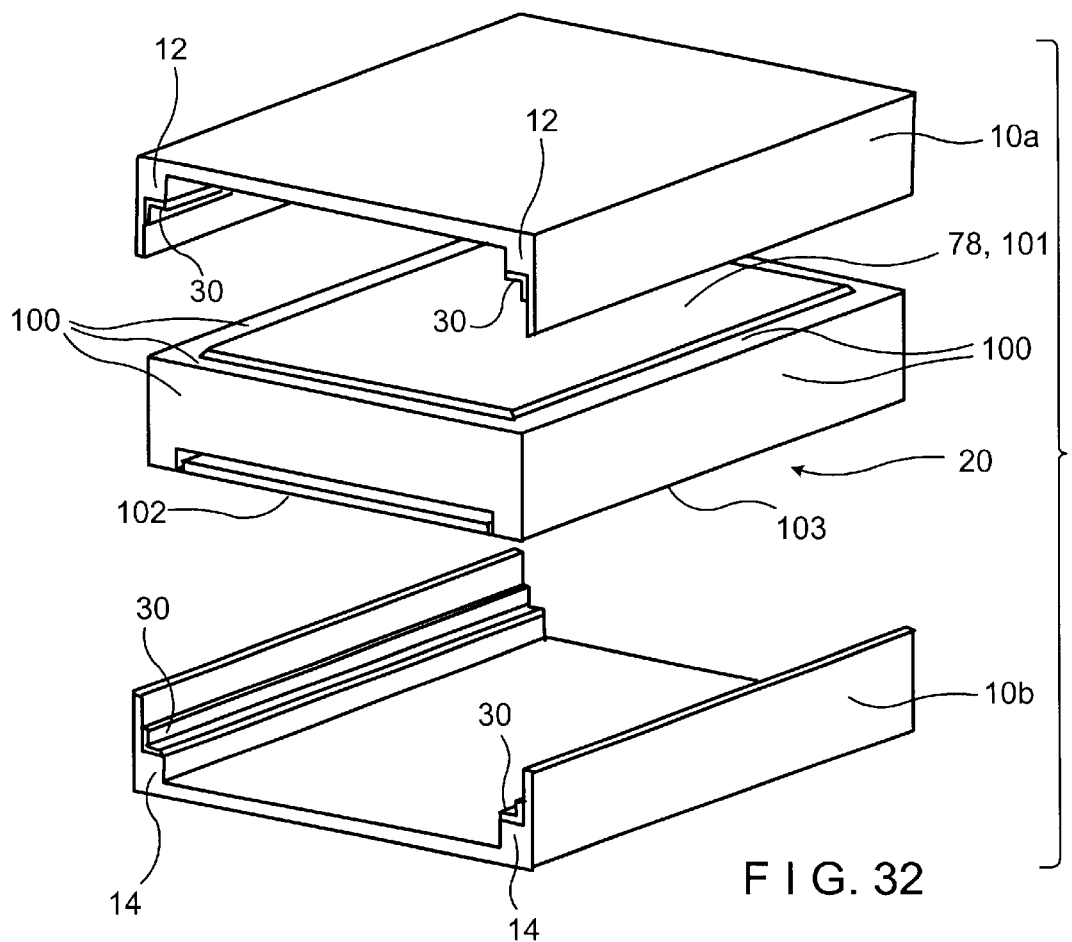
FIGS. 32 and 33 an isometric and front view of an alternative application example of a data storage device unit, versus the example described in connection with FIGS. 6 and 7, comprising a disc assembly unit with two in cross-section U-shell shaped parts, which support the data storage device and form hollow shafts across the bottom and top of the drive.
Figure 33:
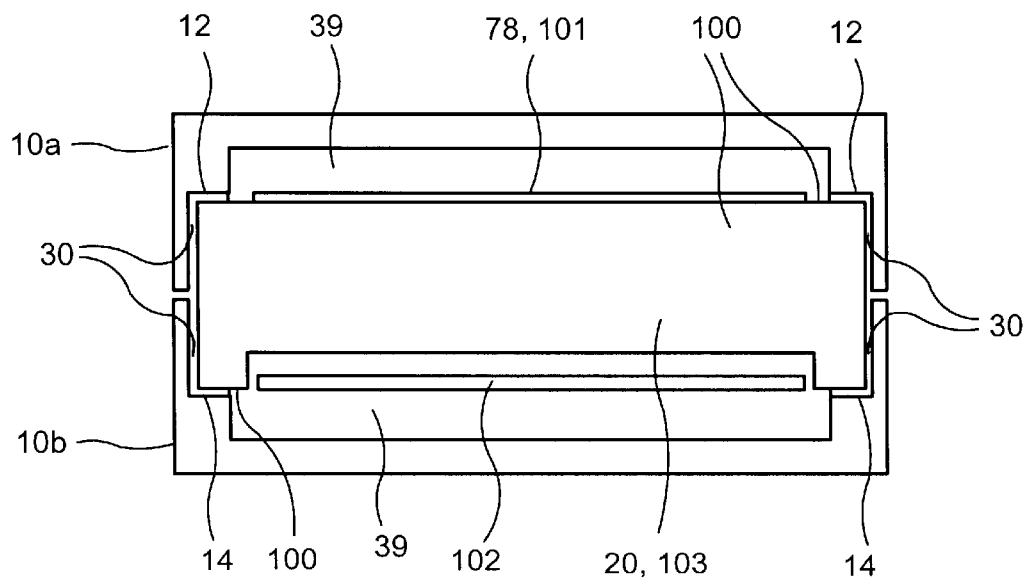

Further possible alternatives and advanced constructions of the described application examples are related to the geometric shape and embodiment of the assembly unit 10 and layer 30 as displayed in FIGS. 32 and 33, based on possible future designs of disc drives. In the present state-of-the-art designs, a lid 101 and controller PCB 102 basically cover the total top and bottom of drive assembly 103. Upon shrinking the disc media from 3.5 inches down to for example 2.8 inches as recently done while introducing the 15000 RPM drive, a standard 3.5 inch drive assembly 103 indicates more space between the perimeter of the media and the perimeter of the drive assembly 103. Under such circumstances it is now possible to shrink the lid 101 and the controller-PCB 102 in such a manner, that surface-means 100 are now available on the perimeter of the drive assembly 103, facing to the top 78 and bottom of the data storage device 20.

In a further embodiment of the invention, as displayed in FIGS. 32 and 33 in accordance to the herein above described alternatives, the assembly-unit-parts 10*a* and 10*b* of assembly-unit 10 are shaped as U-shells, which are pushed over the disc-drive 20 from the top 78 and bottom. Layer 30 is formed by a plurality of L-shaped segments aligned on the perimeter edges of drive assembly 103. With non displayed, suited fastening means the assembly-unit-parts 10*a* and 10*b*, supported on a plurality of L-shaped segments forming layer 30, are clamped onto the surface-means 100 on the perimeter of drive assembly 103. Thereby, data storage device 20 is again supported between assembly-unit-parts 10*a* and 10*b*. As in the previous application examples, the side-wall-surface-means 12, 14 again indicate sufficient contact surface to the surface-means 100 of drive assembly 103 conducted by layer 30. In terms of oscillation attenuation and thermal heat relief, this construction is functionally identical to the previous embodiments. The advantage here is, that the damping mounts and screws on the outside of assembly unit 10 are now obsolete. With this embodiment of this invention, it is now possible to facilitate a totally tool-less assembly of data storage device 20 within housing 1. Thereby, the cost of system integration assembly in mass production is now equivalent to commonly assembled data storage devices, with all the functional advantages of this invention.

As indicated in the summary of the invention, at least parts of the herein above described system-integration embodiments of the invention may also be embodied as integrated part of the data storage device housing itself. This conclusion is particularly supported by the embodiments of FIGS. 6, 7, 14, 16, 17, 18, 29 and FIGS. 32, 33. As set forth below one possible equivalent disc drive integration solution will be described in accordance with claim 33 and 49 of the invention.

Figure 34:
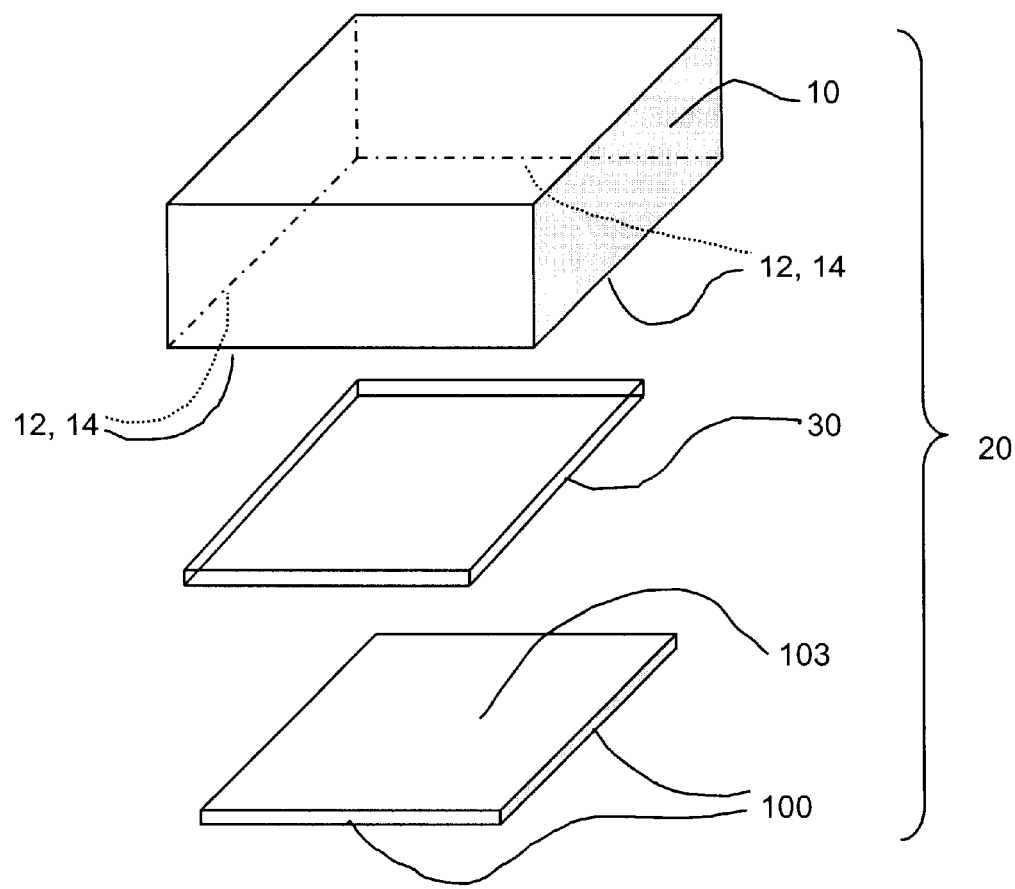
FIGS. 34 and 35 an isometric principle view of an alternative application example of a data storage device unit, versus in particular the examples described in connection with FIGS. 6, 7, 16, 17, 18, 29, 32 and 33, comprising a cuboid shaped assembly unit with open bottom, an oscillation attenuating and thermal conductive layer, whereby the drive assembly and layer fits into the bottom of the assembly, forming the device integrated solution. A side view of an assembled data storage device according to FIG. 34 with carrier-surface and fastening-surface-oscillation-damper, assembly unit with supporting surfaces for the dampers, as device integrated solution

In a further embodiment of the invention, assembly-unit 10 as displayed in FIG. 34 now forms a part of the data storage device housing. The drive assembly 103 comprises a non displayed drive motor, a non displayed disc-media and non displayed read/write head actuator. Drive assembly 103 has surface means 100 on its perimeter and is supported between side-wall-surface-means 12 and 14 of the assembly unit 10. A layer 30 is aligned between the surface means 100 of drive assembly 103 and the side-wall-surface-means 12, 14 of assembly unit 10 now forming a part of the closed housing of the data storage device 20. Equivalent to the previous extensively discussed system integration solutions, again the drive assembly 103 comprising all sources of vibration and heat of the data storage device 20, is high-frequency de-coupled from the assembly unit 10. And again the thermal conductivity of Layer 30 permits a strong thermal flow of heat onto assembly unit 10.

Figure 35:
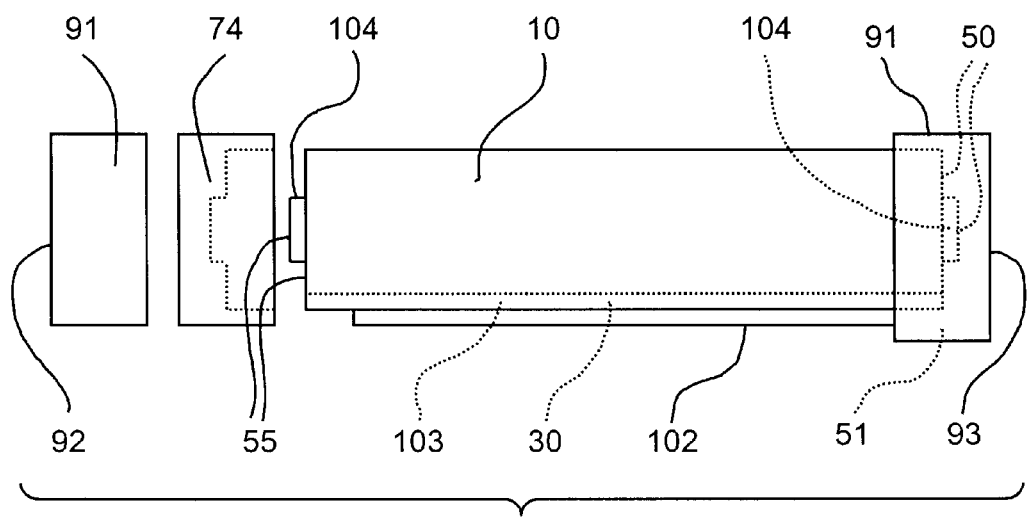

As displayed in FIG. 35 the two opposite facing ends of the data storage device 20 have protrusions 104 which fit into dampers 51 and 74, whereby the dampers 51 and 74 are similar in shape to those displayed in FIG. 29. The protrusions 104 on two opposite facing sides of data storage device 20 forming part of the damper-fastening-surface 55 and damper-carrier-surface 50 are encompassed by the dampers 51 and 74 in a similar manner as displayed in FIGS. 14, 16 or 18. Assembly unit 91 with supporting surfaces 92, 93 encompass the dampers 51 and 74. The two parts of assembly unit 91 comprising supporting surfaces 92, 93 are either mechanically linked by non displayed fastening means or the system integration slots of housing 1, or any other housing for accommodating data storage device 20.

In a practical application assembly unit 91 would outline the greatest outer dimensions of a disc drive. Assembly unit 10 plus drive assembly 103 plus controller PCB 102 representing a complete disc drive would then be slightly narrower in dimension as to avoid assembly unit 10 touching any part of the system integration facilities of housing 1. As the outer dimension of assembly unit 91 is equivalent to the outer dimension of disc drives as produced by the state-of-the-art, the invention may now be considered as integrated part of data storage device 20. It is now bearable in mind that further equivalent integrated embodiments of the invention are possible based on the herein above described system integration solutions. This i.e. refers in particular to housings of CD-ROM or other, whereby the drive assembly 103 of such devices are supported between dampers 51 and 74. In such devices the demand for low-frequency vibration damping is dominating versus the demand of cooling. Per definition the drive assembly 103 may be a distinct component within a data storage device 20 or part of data storage device 20.

Reference Indicator List 1 housing
2 frame
3 supporting-surface
4 bottom-panel
5 main fan
6 rear panel
7 exit vents
8 lid
9 add-on fan
10 assembly unit
10A assembly unit part
10B assembly unit part
11 screw
12 side-wall-surface-means
13 screw
14 side-wall-surface-means
15 screw
16 hollow shaft bottom
17 screw
18 heat sink
19 screw
20 data storage device
21 screw
22 rivet
23 fastening means
24 rivet
25 fastening means
26 rivet
27 fastening means
28 rivet
29 cage
30 oscillation attenuating layer
31 compensation holes
32 sandwich foam lining
33 front panels
34 drill holes
35 drill holes
36 self cutting thread
37 concentric extension
38 thread
39 hollow shaft
40 disc drive fan
41 fan passage vents
42 fan passage vents
43 space
44 gasket
45 floppy-disc drive
46 sandwich foam lining
47 sandwich foam lining
48 sandwich foam lining
49 sandwich foam lining
50 damper-carrier-surface
51 carrier-surface-oscillation-damper
52 reinforcement panel
53 power supply
54 rivet
55 damper-fastening-surface
56 screw
57 screw
58 bus connector
59 power connector
60 thermal conductor
61 torque-momentum-distributor-bridge
62 oscillation attenuating underlay
63 torque-momentum-distributor-bridge
64 oscillation attenuating underlay 65 fan fastening means
66 drill hole
67 fan fastening means
68 drill hole
69 rivet
70 torque-momentum-equalizer-panel
71 fastening edge
72 fastening edge
73 fastening edge
74 fastening-surface-oscillation-damper
75 tuning panel
76 tuning screw
77 thread extension
78 disc drive top side
79 shank
80 shank
81 shank
82 shank
83 gap
84 hollow shaft
85 cooling fins
88 thread
89 passage opening
90 sleeve
91 assembly unit
92 supporting-surface
93 supporting-surface
94 blank-space
95 passage opening
96 passage opening
97 extension
98 extension
99 sleeve
100 surface means
101 lid
102 controller PCB
103 drive assembly
104 protrusion

What is claimed is:

1. A housing for motorized driven data storage device(s) or for accommodating such device(s), comprising:
a damper-carrier-surface and a damper-fastening-surface allocated to one side of a drive assembly and two opposite facing sides of a supporting-surface,
at least one carrier-surface-oscillation-damper arranged between said damper-carrier-surface and said supporting-surface with at least one respective contact surface on said damper-carrier-surface, and said supporting-surface in at least a partial two-dimensional manner,
at least one fastening-surface-oscillation-damper arranged between said damper-fastening-surface and said supporting-surface with at least one respective contact surface on said damper-fastening-surface, and said supporting-surface in at least a partial two-dimensional manner, and
said damper-carrier-surface and said damper-fastening-surface are mechanically linked, providing simultaneous operation of said fastening-surface-oscillation damper and said carrier-surface-oscillation-damper.

2. Housing according to claim 1, wherein the damper-carrier-surface is an integrated part of one side of the drive assembly.

3. Housing according to claim 1, wherein the damper-carrier-surface is a distinct component, which is mechanically linked to one side of the drive assembly.

4. Housing according to claim 1, wherein an assembly unit is allocated to the drive assembly, the damper-carrier-surface is a distinct component and mechanically linked to one side of said assembly unit, and said drive assembly is supported between the side-wall-surface-means of said assembly unit.

5. Housing according to claim 1, wherein the drive assembly is arranged within an assembly unit, and the damper-carrier-surface or the damper-fastening-surface is an integrated part of said assembly unit.

6. Housing according to claim 1, wherein the drive assembly is arranged within an assembly unit, and the damper-carrier-surface and the damper-fastening-surface are integrated parts of said assembly unit.

7. Housing according to claim 1, wherein means are provided to alter the pre-pressure-tension of the carrier-surface-oscillation-damper and the fastening-surface-oscillation-damper.

8. Housing according to claim 1, wherein blank-spaces or holes are respectively provided in different areas of the carrier-surface-oscillation-damper and the fastening-surface-oscillation-damper, in such a manner that the data storage device unit formed by the assembly unit and the data storage device is generally lined up in rectangular position relative to the front panel after their assembly.

9. Housing according to claim 1, wherein the width and the material properties of the carrier-surface-oscillation-damper and the fastening-surface-oscillation-damper are chosen in such a manner, that the damper system comprising a damper-carrier-surface, said carrier-surface-oscillation-damper, said fastening-surface-oscillation-damper and the damper-fastening-surface, forms a low-pass system which essentially oscillates under counter-coupling conditions in the crucial frequency range of the data storage device.

10. Housing according to claim 1, wherein the carrier-surface-oscillation-damper and the fastening-surface-oscillation-damper are partial areas of an oscillation damper embodied as an integrated unit.

11. Housing according to claim 1, wherein the components forming the damper and assembly system of the data storage device are provided with aligned drill holes which determine at least a portion of the air-inlet of the air which is pulled into housing.

12. Housing according to claim 1, in which the drive assembly is arranged in an assembly unit, wherein the assembly unit is embodied by several distinct parts and at least consisting of two assembly-parts.

13. Housing according to claim 1, in which the drive assembly is arranged in an assembly unit, wherein the drive assembly is fastened with screws gripping into the drive assembly, which are supported on the side-wall-surface-means of said assembly unit, by torque-momentum-distributor-bridges and oscillation attenuating underlay.

14. Housing according to claim 1, wherein the support-surface is a partial area of the front-panel and said front-panel is at least stabilized in the area of said support-surface.

15. Housing according to claim 1, wherein the carrier-surface- oscillation-damper and the fastening-surface-oscillation-damper are composed of several layers and the distinct layers indicate different properties.

16. Housing according to claim 7, wherein a two-dimensional shaped tuning-panel is provided between the damper-carrier-surface and the carrier-surface-oscillation-damper or between the damper-fastening-surface and the fastening-surface-oscillation-damper following consecutive respectively to each of the oscillation dampers, and a tuning-gadget is provided which grips into the carrier- or damper-fastening-surface on one hand and into the tuning-panel on the other hand, by which the tuning-panel is adjustable away from the carrier- or damper-fastening-surface, with direction onto the oscillation damper.

17. A housing for motorized driven data storage device(s) or for accommodating such devices, comprising:
   a damper-carrier-surface and a damper-fastening-surface allocated to one side of a drive assembly and one side of a supporting-surface,
   at least one carrier-surface-oscillation-damper arranged between said damper-carrier-surface and said supporting-surface with at least one respective contact surface on said damper-carrier-surface, and said supporting-surface in at least a partial two-dimensional manner,
   at least one fastening-surface-oscillation-damper arranged between said damper-fastening-surface and said damper-carrier-surface with at least one respective contact surface on said damper-fastening-surface, and said damper-carrier-surface in at least a partial two-dimensional manner, and
   said supporting-surface and said damper-fastening-surface are mechanically linked, providing simultaneous operation of said fastening-surface-oscillation damper and said carrier-surface-oscillation damper.

18. Housing according to claim 17, wherein the damper-carrier-surface is an integrated part of one side of the drive assembly.

19. Housing according to claim 17, wherein the damper-carrier-surface is a distinct component, which is mechanically linked to one side of the drive assembly.

20. Housing according to claim 17, wherein an assembly unit is allocated to the drive assembly, the damper-carrier-surface is a distinct component and mechanically linked to one side of said assembly unit, and said drive assembly is supported between the side-wall-surface-means of said assembly unit.

21. Housing according to claim 17, wherein the drive assembly is arranged within an assembly unit, and the damper-carrier-surface or the damper-fastening-surface is an integrated part of said assembly unit.

22. Housing according to claim 17, wherein the drive assembly is arranged within an assembly unit, and the damper-carrier-surface and the damper-fastening-surface are integrated parts of said assembly unit.

23. Housing according to claim 17, wherein means are provided to alter the pre-pressure-tension of the carrier-surface-oscillation-damper and the fastening-surface-oscillation-damper.

24. Housing according to claim 17, wherein blank-spaces or holes are respectively provided in different areas of the carrier-surface-oscillation-damper and the fastening-surface-oscillation-damper, in such a manner that the data storage device unit formed by the assembly unit and the data storage device is generally lined up in rectangular position relative to the front panel after their assembly.

25. Housing according to claim 17, wherein the width and the material properties of the carrier-surface-oscillation-damper and the fastening-surface-oscillation-damper are chosen in such a manner, that the damper system comprising a damper-carrier-surface, said carrier-surface-oscillation-damper, said fastening-surface-oscillation-damper and the damper-fastening-surface forms a low-pass system which essentially oscillates under counter-coupling conditions in the crucial frequency range of the data storage device.

26. Housing according to claim 17, wherein the carrier-surface-oscillation-damper and the fastening-surface-oscillation-damper are partial areas of an oscillation damper embodied as an integrated unit.

27. Housing according to claim 17, wherein the components forming the damper and assembly system of the data storage device are provided with aligned drill holes which determine at least a portion of the air-inlet of the air which is pulled into housing.

28. Housing according to claim 17, in which the drive assembly is arranged in an assembly unit, wherein the assembly unit is embodied by several distinct parts and at least consisting of two assembly-parts.

29. Housing according to claim 17, in which the drive assembly is arranged in an assembly unit, wherein said drive assembly is fastened with screws, gripping into the drive assembly, which are supported on the side-wall-surface-means of said assembly unit by torque-momentum-distributor-bridges and oscillation attenuating underlay.

30. Housing according to claim 17, wherein the support-surface is a partial area of the front-panel and said front-panel is at least stabilized in the area of said support-surface.

31. Housing according to claim 17, wherein the carrier-surface- oscillation-damper and the fastening-surface-oscillation-damper are composed of several layers and that the distinct layers indicate different properties.

32. Housing according to claim 23, wherein a two-dimensional shaped tuning-panel is provided between the damper-carrier-surface and the carrier-surface-oscillation-damper or between the damper-fastening-surface and the fastening-surface-oscillation-damper following consecutive respectively to each of the oscillation dampers, and a tuning-gadget is provided which grips into the carrier- or damper-fastening-surface on one hand and into the tuning-panel on the other hand, by which the tuning-panel is adjustable away from the carrier- or damper-fastening-surface, with direction onto the oscillation damper.

33. A housing for motorized driven data storage device(s) or for accommodating such device(s), comprising:
   a damper-carrier-surface and a damper-fastening-surface allocated to two opposite facing sides of a drive assembly and two supporting-surfaces,
   at least one carrier-surface-oscillation-damper arranged between said damper-carrier-surface and a first supporting-surface with at least one respective contact surface on said damper-carrier-surface, and said first supporting-surface in at least a partial two-dimensional manner,
   at least one fastening-surface-oscillation-damper arranged between said damper-fastening-surface and a second supporting-surface with at least one respective contact surface on said damper-fastening-surface, and said second supporting-surface in at least a partial two-dimensional manner, and
   said first supporting-surface and said second supporting-surface are mechanically linked, providing simultaneous operation of said fastening-surface-oscillation damper and said carrier-surface-oscillation damper.

34. Housing according to claim 33, wherein the carrier-surface-oscillation-damper and the fastening-surface-oscillation-damper are casted parts, respectively provided with circumfering extensions projecting from their perimeter.

35. Housing according to claim 33, wherein the damper-carrier-surface or the damper-fastening-surface are respectively integrated parts of two opposite facing sides of the drive assembly.

36. Housing according to claim 33, wherein the damper-carrier-surface and the damper-fastening-surface are respectively integrated parts of two opposite facing sides of the drive assembly.

37. Housing according to claim 33, wherein the damper-carrier-surface or the damper-fastening-surface are distinct components and mechanically linked to respectively each one of two opposite facing sides of the drive assembly.

38. Housing according to claim 33, wherein the damper-carrier-surface and the damper-fastening-surface are distinct components and mechanically linked respectively to each one of two opposite facing sides of the drive assembly.

39. Housing according to claim 33, wherein the damper-carrier-surface and the damper-fastening-surface are distinct components and mechanically linked to two opposite facing sides of an assembly unit, and the drive assembly is supported between the side-wall-surface-means of said assembly unit.

40. Housing according to claim 33, wherein the drive assembly is arranged within an assembly unit, and the damper-carrier-surface or the damper-fastening-surface is an integrated part of said assembly unit.

41. Housing according to claim 33, wherein the drive assembly is arranged within an assembly unit, and the damper-carrier-surface and the damper-fastening-surface are integrated parts of said assembly unit.

42. Housing according to claim 33, wherein extensions are provided on the perimeter of the carrier-surface-oscillation-damper and the fastening-surface-oscillation-damper, which encompass the damper-carrier-surface and the damper-fastening-surface.

43. Housing according to claim 33, wherein the width and the material properties of the carrier-surface-oscillation-damper and the fastening-surface-oscillation-damper are chosen in such a manner, that the damper system comprising a damper-carrier-surface said carrier-surface-oscillation-damper, said fastening-surface-oscillation-damper and the damper-fastening-surface forms a low-pass system which essentially oscillates under counter-coupling conditions in the crucial frequency range of the data storage device.

44. Housing according to claim 33, wherein the carrier-surface-oscillation-damper and the fastening-surface-oscillation-damper are partial areas of an oscillation damper embodied as an integrated unit.

45. Housing according to claim 33, wherein the components forming the damper and assembly system of the data storage device are provided with aligned drill holes which determine at least a portion of the air-inlet of the air which is pulled into the housing.

46. Housing according to claim 33, in which the drive assembly is arranged in an assembly unit, wherein the assembly unit is embodied by several distinct parts and at least consisting of two assembly-parts.

47. Housing according to claim 33, in which the drive assembly is arranged in an assembly unit, wherein said drive assembly is fastened with screws gripping into the drive assembly, which are supported on the side-wall-surface-means of said assembly unit by torque-momentum-distributor-bridges and oscillation attenuating underlay.

48. Housing according to claim 33, wherein the carrier-surface-oscillation-damper and the fastening-surface-oscillation-damper are composed of several layers and that the distinct layers indicate different properties.

49. A housing for motorized driven data storage device(s) or for accommodating such device(s), comprising:
   a surface means on a perimeter of a drive assembly,
   an assembly unit having good thermal conductive properties and further having side-wall-surface-means wherein said side-wall-surface-means are allocated to said drive assembly, and
   an oscillation attenuating layer having good thermal conductive properties aligned between said drive assembly and said assembly unit, with sufficient contact surface to said surface means on said perimeter of said drive assembly, and with sufficient contact-surface to said side-wall-surface-means of said assembly unit.

50. Housing according to claim 49, wherein the oscillation attenuating layer is formed by a plurality of segments.

51. Housing according to claim 49, wherein the oscillation attenuating layer is formed by a ribbon shaped material.

52. Housing according to claim 49, wherein the oscillation attenuating layer is formed by a lamination or plurality of laminations, at least applied onto the inner sides of the side-wall-surface-means of the assembly unit.

53. Housing according to claim 49, wherein the oscillation attenuating layer is arranged under sufficient pressure-force, to warrant the contact-surface between the surface means of the drive assembly and the side-wall-surface-means of the assembly unit.

54. Housing according to claim 49, wherein at least two thermal transitions are provided across the layer respectively between the surface means of the drive assembly and the assembly unit.

55. Housing according to claim 49, wherein at least one heat-sink provided with cooling-fins is thermally conductive well attached to the assembly unit and said cooling-fins of said heat-sink at least partially project into the air-stream generated by the main fan of the housing.

56. Housing according to claim 49, wherein the assembly unit is embodied as a heat-sink.

57. Housing according to claim 49, in which the drive assembly is arranged in an assembly unit, wherein the assembly unit is embodied by several distinct parts and at least consisting of two assembly-parts.

58. Housing according to claim 49, in which the drive assembly is arranged in an assembly unit, wherein said drive assembly is fastened with screws gripping into the drive assembly, which are supported on the side-wall-surface-means of said assembly unit by torque-momentum-distributor-bridges and oscillation attenuating underlay.

59. Housing according to claim 49, wherein the surfaces of the assembly unit are at least partially subjected to the air-circulation prevailing in the housing.

60. Housing according to claim 49, wherein the surfaces of the assembly unit are at least partially subjected to the air-circulation forced by a fan.

61. Housing according to claim 49, wherein the surfaces of the data storage device are at least partially subjected to the air-circulation prevailing in the housing.

62. Housing according to claim 49, wherein the surfaces of the data storage device are at least partially subjected to the air-circulation forced by a fan.

63. Housing according to claim 56, wherein the assembly unit is provided with integrated cooling-fins.

64. A housing for motorized driven data storage device(s) or for accommodating such device(s), comprising:
   a top-side and a bottom side of said data storage device(s),
   an assembly unit, constructed with low resonance properties allocated to a drive assembly, wherein said assembly unit(s) forms a hollow shaft around said data storage device(s) and the perpendicular distance between said top-side of said data storage device and the adjacent inner side of said hollow shaft, and the perpendicular distance between said bottom side of data storage device(s) and the adjacent inner side of said hollow shaft, does not exceed $\lambda/4$, of the highest expected relevant acoustic frequency.

65. Housing according to claim 64, wherein the assembly unit is provided with an at least partially reflecting cut-off surface on one side of the hollow shaft.

66. Housing according to claim 64, wherein the assembly unit is respectively provided on both sides of the hollow-shaft with an at least partially reflecting cut-off surface.

67. Housing according to claim 64, in which the data storage device is arranged in an assembly unit, wherein the assembly unit is embodied by several distinct parts and at least consisting of two assembly-parts.

68. Housing according to claim 64, in which the data storage device is arranged in an assembly unit, wherein said data storage device is fastened with screws gripping into the drive assembly, which are supported on the side-wall-surface-means of said assembly unit by torque-momentum-distributor-bridges and oscillation attenuating underlay.

69. Housing according to claim 65, wherein the cut-off surface is formed by a damper-carrier-surface.

70. A housing for motorized driven data storage device(s) or for accommodating such device(s), comprising:

a top-side and a bottom side of said data storage device(s), an assembly unit constructed with low resonance properties allocated to said data storage device(s), wherein said assembly unit(s) forms a hollow shaft around said data storage device(s), and the perpendicular distance between said top-side of said data storage device(s) and the adjacent inner side of said hollow shaft, and the perpendicular distance between said bottom-side and the adjacent inner side of said hollow shaft, does not exceed $\lambda/4$, of the highest expected relevant acoustic frequency.

71. Housing according to claim 70, wherein the assembly unit is respectively provided with an at least partially reflecting cut-off surface, on two opposite facing sides of the hollow shaft.

72. Housing according to claim 70, wherein the cut-off surfaces are formed by the support-surfaces.

* * * * *